US012495803B2

(12) United States Patent
Ruhe et al.

(10) Patent No.: US 12,495,803 B2
(45) Date of Patent: Dec. 16, 2025

(54) SHEETER WITH REMOVEABLE CUTTING ROLLER SLEEVE

(71) Applicant: J.C. Ford Company, La Habra, CA (US)

(72) Inventors: Scott D. Ruhe, Yorba Linda, CA (US); Steven King, Taylorsville, UT (US); Daniel Ruhe, Yorba Linda, CA (US); Paul Winocur, Lake Forest, CA (US); Michael Frechette, Anaheim, CA (US)

(73) Assignee: J.C. Ford Company, Columbia, TN (US)

( * ) Notice: Subject to any disclaimer, the term of this patent is extended or adjusted under 35 U.S.C. 154(b) by 0 days.

(21) Appl. No.: 17/981,210

(22) Filed: Nov. 4, 2022

(65) Prior Publication Data

US 2023/0146996 A1     May 11, 2023

Related U.S. Application Data

(60) Provisional application No. 63/276,419, filed on Nov. 5, 2021.

(51) Int. Cl.
*A21C 3/02* (2006.01)
*A21C 11/10* (2006.01)

(52) U.S. Cl.
CPC .............. *A21C 3/024* (2013.01); *A21C 11/10* (2013.01)

(58) Field of Classification Search
CPC ......... A21C 3/024; A21C 11/10; A21C 11/04; A21C 11/08; A21C 11/103; A21C 1/006; A21C 3/00; A21C 3/021; A21C 3/02; A21C 3/028; Y10T 29/49764; B26D 1/03; B26D 5/02; B26D 7/01; B65H 2404/13211
See application file for complete search history.

(56) References Cited

U.S. PATENT DOCUMENTS

| 2,655,118 | A | * | 10/1953 | Whitehead | A21C 3/02 425/363 |
| 2,699,737 | A | * | 1/1955 | Sticelber | A21C 3/02 425/363 |
| 4,492,550 | A | * | 1/1985 | Levine | A21C 11/18 425/142 |
| 5,470,599 | A |   | 11/1995 | Ruhe | |
| 5,783,222 | A | * | 7/1998 | Voyatzakis | A21C 3/06 425/320 |
| 5,811,137 | A | * | 9/1998 | Clark | A21C 3/02 100/168 |
| 6,024,554 | A | * | 2/2000 | Lawrence | A21C 11/10 425/363 |

(Continued)

FOREIGN PATENT DOCUMENTS

EP     1132001 A1 * 9/2001 ............. A21C 11/22

*Primary Examiner* — Seyed Masoud Malekzadeh
(74) *Attorney, Agent, or Firm* — Knobbe, Martens, Olson & Bear, LLP

(57) ABSTRACT

A sheeter can include a cutting roller having a driveshaft and a removeable a cutting sleeve. The removeable cutting sleeve can simplify the process for replacing the cutting surface of a cutting roller. Additionally, the sheeter can include a mounting arrangement that supports the driveshaft of the cutting roller in a cantilevered manner, and an access portion allowing the removal sleeves to be pulled off of the driveshaft without removing the driveshaft from the sheeter.

18 Claims, 39 Drawing Sheets

(56) References Cited

U.S. PATENT DOCUMENTS

| | | | | |
|---|---|---|---|---|
| 6,530,771 B1* | 3/2003 | Clark | | A21C 11/10 |
| | | | | 83/563 |
| 6,612,825 B2* | 9/2003 | Warner | | A21C 11/16 |
| | | | | 425/DIG. 235 |
| 6,843,761 B1* | 1/2005 | Uchida | | B65H 27/00 |
| | | | | 492/53 |
| 7,887,314 B2 | 2/2011 | Ruhe et al. | | |
| 8,347,480 B2 | 1/2013 | Ruhe et al. | | |
| 8,740,602 B2 | 6/2014 | Ruhe et al. | | |
| 9,468,217 B2 | 10/2016 | Ruhe et al. | | |
| 9,635,865 B1* | 5/2017 | Schmidt | | B65G 45/10 |
| 10,791,746 B2* | 10/2020 | McCarty, Jr. | | A21C 3/024 |
| 2003/0049341 A1* | 3/2003 | Warner | | A21C 11/16 |
| | | | | 425/308 |
| 2004/0142062 A1* | 7/2004 | Herrera | | A21C 11/10 |
| | | | | 425/363 |
| 2005/0175728 A1* | 8/2005 | Herrera | | A21C 3/02 |
| | | | | 425/363 |
| 2006/0146111 A1* | 7/2006 | Vanous | | G03D 13/002 |
| | | | | 347/113 |
| 2006/0222749 A1* | 10/2006 | Ruhe | | A21C 3/02 |
| | | | | 426/502 |
| 2009/0090253 A1* | 4/2009 | Wells | | A21C 3/02 |
| | | | | 99/485 |
| 2011/0197415 A1* | 8/2011 | Ruhe | | A21C 3/02 |
| | | | | 29/426.1 |
| 2011/0311698 A1* | 12/2011 | Morris | | A21C 3/02 |
| | | | | 426/502 |
| 2012/0225151 A1* | 9/2012 | Ruhe | | A21C 3/021 |
| | | | | 425/150 |
| 2019/0343131 A1* | 11/2019 | McCarty, Jr. | | A21C 3/024 |
| 2021/0092962 A1* | 4/2021 | Van Gerwen | | A21C 5/003 |
| 2021/0298314 A1 | 9/2021 | Ruhe | | |
| 2023/0122760 A1* | 4/2023 | Collado | | E05D 15/1047 |
| | | | | 49/362 |

* cited by examiner

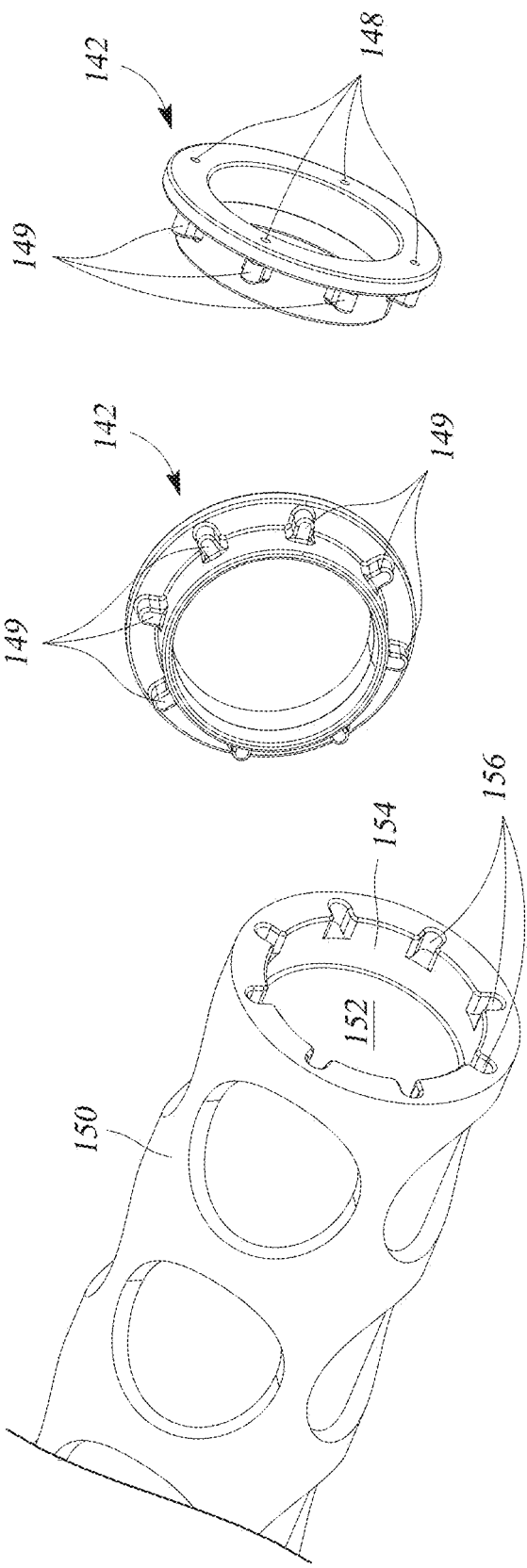

SHEETER WITH REMOVEABLE CUTTING ROLLER SLEEVE

PRIORITY INFORMATION

Any and all applications for which a foreign or domestic priority claim is identified in the Application Data Sheet as filed with the present application are hereby incorporated by reference under 37 C.F.R. § 1.57.

This application claims the benefit of U.S. Provisional Patent Application No. 63/276,419, filed Nov. 5, 2021, the entire contents of which is hereby incorporated by reference in its entirety.

BACKGROUND

Field

The present inventions relate to improvements in high speed production sheeting devices for comestible products (e.g., tortillas and tortilla chips). More specifically, the present inventions relate to sheeting devices with more easily serviceable cutting rollers.

Related Art

Corn tortillas and tortilla chips are cut from a sheet of corn dough, called "masa," and then baked and/or fried. In mass production, the sheeting and cutting stages are accomplished by a tortilla sheeter.

High production tortilla sheeters feed masa from a hopper between a pair of large, stainless steel rollers which roll the masa into a sheet of substantially uniform thickness. The rollers are spaced apart in production to form a gap, known as a "pinch point gap," through which the masa passes. The masa adheres to the surface of one of the rollers, known as the exit roller, after passing through the pinch point gap. A third roller then cuts the masa into either tortillas or tortilla chips. The third roller, known as the cutting roller, commonly has either circular shaped (for tortillas) or triangular-shaped (for tortilla chips) cutting guides positioned on the cylindrical external surface of the cutting roller. The cut tortillas or chips then are stripped from the exit roller by a stripper wire and/or a blower, or by a similar device.

With use, various components of such tortilla sheeters must be serviced or replaced, such as the stripper wires, conveyors, rollers, including the cutting roller. With some known sheeters, the cutting rollers are typically formed of a solid metal shaft with a bonded layer of food safe plastic, such as Acetal on the outer surface. The outer surface on the plastic is cut or machined to provide the desired cutting guides for producing the desired final shape of cut dough. With use, the plastic material can deform insufficiently to the point where it can no longer be used. The procedure for replacing this type of known cutting roller is to remove the cutting roller from the sheeter machine, remove the layer of plastic, reapply new layer of plastic, the cut the layer of plastic to include the desired cutting guides. Current cutting rollers can be extremely heavy and often require two or more people and the use of a machine to install and remove. In part because of the difficulty in installing cutting rollers, the cutting rollers are often not sufficiently rigid and bow in the middle as a result. Cutting rollers also bow as a result of the cutting pressure applied during use. The effect of the bow in the middle of a cutting roller can result in uneven cutting of the masa, which may lead to further issues during the food production process.

SUMMARY

An aspect of at least one of the inventions disclosed herein includes the realization that a significant amount of labor and parts costs can be saved by forming a cutting roller with a driveshaft and a removeable outer cutting sleeve. With such a configuration, the outer cutting sleeve can be removed from the driveshaft and replaced without the need to replace the entire cutter and shaft and/or without the need for removal of the bonded outer layer of plastic, reapplication of a new layer of plastic to the shaft.

Additionally, further optional advantages can be achieved by mounting the cutting roller driveshaft with a sufficiently sized bearing so as to support the shaft by one end. As such, the outer cutting sleeve can be removed from the driveshaft without removing the shaft from the sheeter. This can save a substantial amount of time and labor as a plastic cylindrical cutting sleeves, separate from the driveshaft, are much lighter than the full assembly of the shaft and the plastic necessary for making a cutting roller. In fact, a typical steel core of a cutting roller alone can be hundreds of pounds in a typical sheeter machine. However, the plastic bonded to the outer surface of the shaft is only about 100-200 pounds. With a removeable outer cutting sleeve, therefore, cutting roller servicing can be greatly simplified.

Another aspect of at least one of the inventions disclosed herein includes the realization that additional optional benefits can be achieved by providing the outer cutting sleeve with engaging features such that torque from the driveshaft can be transferred to the axial ends of the cutting sleeve, thereby reducing or eliminating the need to transfer torque directly from the driveshaft to the inner bore of the cutting sleeve. This allows the cutting sleeve to have an inner diameter that is sized to provide for easier sliding of the cutting sleeve along the length of the driveshaft, further simplifying removal and reinstallation.

Another aspect of at least one of the inventions disclosed herein includes the realization that a removable cutting sleeve for a cutting roller can be made into pieces, thereby further simplifying and reducing the burden on maintenance workers for servicing the cutting roller. For example, a cutting sleeve for a cutting roller can be divided into two or more pieces, with engaging features on the ends configured to engage with each other thereby transferring torque between the individual sleeve members, directly, or by way of an intermediate member.

Another aspect of at least one of the inventions disclosed herein includes the realization that a removable cutting sleeve avoids the need to remove the cutter shaft from the machine on a regular basis and thus the cuter shaft can be more permanently mounted to a sheeter and thus can be heavier and stiffer. As such, a sheeter with a stiffer shaft can be constructed without a center support for the cutter shaft, thereby avoiding some cost of parts and an interruption of the output of the sheeter.

Thus, in accordance with some embodiments, a dough sheeting device can comprise a support frame having a first side member and a second side member, the second side member comprising a cutting roller access aperture; a rear roller having a first outer surface and supported by the support frame to rotate about a first axis; a front roller having a second outer surface and supported by the support frame to rotate about a second axis spaced from the first axis such that juxtaposed portions of the first and second outer surfaces define a pinch point gap; a cutting roller assembly having an outer cutting surface and supported by the support frame to rotate about a third axis spaced from the second axis such that the outer cutting surface and the second outer surface are sufficiently close to cut dough. The cutting roller assembly can comprise a drive shaft having a first bearing support surface at a first end, a second bearing support surface at a second end, and a cutting sleeve support surface disposed between the first and second ends; a first bearing assembly supported by the first side member of the support frame and rotatably supporting the first bearing support surface of the drive shaft; an access door supported by the second side member over the cutting roller access aperture, the access door being moveable between opened and closed positions; a second bearing assembly supported on the second bearing support surface; at least a first and a second removable cutting sleeve configured to slide over the cutting sleeve support surface of the drive shaft, each of the first and second removable cutting sleeves having first and second axial ends and an outer cutting surface portion defining at least a portion of the outer cutting surface of the cutting roller assembly, each of the first and second of removable cutting sleeves having at least a first engagement portion disposed on at least one of the first and second axial ends and configured to receive or transmit torque; a first torque transfer member fixed to the drive shaft and comprising a second engagement portion engaged with the first engagement portion of the first removable cutting sleeve; at least one inter-sleeve torque transfer member disposed on the cutting sleeve support surface of the drive shaft and between the first and second removable cutting sleeves, the inter-sleeve torque transfer member having a first side and a second side, at least one second engagement portion disposed on the first side and engaged with the first engagement portion on the first removable sleeve and at least one second engagement portion disposed on the second end and engaged with the first engagement portion disposed on the second removable cutting sleeve; wherein the first bearing assembly supports the drive shaft in a cantilevered manner when the access door is in the open position; wherein the first and second removable cutting sleeves can be slid off the drive shaft and through the cutting roller access aperture when the access door is in the open position.

In some embodiments, a dough sheeting device can comprise a support frame having a first side member and a second side member, the second side member comprising a cutting roller access aperture, a rear roller having a first outer surface and supported by the support frame to rotate about a first axis, a front roller having a second outer surface and supported by the support frame to rotate about a second axis spaced from the first axis such that juxtaposed portions of the first and second outer surfaces define a pinch point gap, a cutting roller assembly having an outer cutting surface and supported by the support frame to rotate about a third axis spaced from the second axis such that the outer cutting surface and the second outer surface are sufficiently close to cut dough. The cutting roller assembly can comprise a drive shaft having a first bearing support surface at a first end, a second end, and a cutting sleeve support surface disposed between the first and second ends, a first bearing assembly supported by the first side member of the support frame and rotatably supporting the first bearing support surface of the drive shaft, a mandrel removably connected to the second end of the drive shaft, the mandrel comprising a second bearing support surface, an access door supported by the second side member over the cutting roller access aperture, the access door being moveable between opened and closed positions, a second bearing assembly supported by the access door, the second bearing surface positioned in the second bearing assembly when the mandrel is connected to the second end of the drive shaft and when the access door is closed, at least a first and a second removable cutting sleeve configured to slide over the cutting sleeve support surface of the drive shaft, each of the first and second removable cutting sleeves having first and second axial ends and an outer cutting surface portion defining at least a portion of the outer cutting surface of the cutting roller assembly, each of the first and second of removable cutting sleeves having at least a first engagement portion disposed on at least one of the first and second axial ends and configured to receive or transmit torque, a first torque transfer member fixed to the drive shaft and comprising a second engagement portion engaged with the first engagement portion of the first removable cutting sleeve, at least one inter-sleeve torque transfer member disposed on the cutting sleeve support surface of the drive shaft and between the first and second removable cutting sleeves, the inter-sleeve torque transfer member having a first side and a second side, at least one second engagement portion disposed on the first side and engaged with the first engagement portion on the first removable sleeve and at least one second engagement portion disposed on the second end and engaged with the first engagement portion disposed on the second removable cutting sleeve, wherein the first bearing assembly supports the drive shaft in a cantilevered manner when the mandrel is disconnected from the second end of the drive shaft, wherein the first and second removable cutting sleeves can be slid off the drive shaft and through the cutting roller access aperture when the access door is in the open position.

In yet additional embodiments, a dough sheeting device can comprise a support frame having a first side member and a second side member, the second side member comprising a cutting roller access aperture, a cutting roller assembly having an outer cutting surface and supported by the support frame to rotate relative to the support frame. The cutting roller assembly can comprise a drive shaft rotatably supported by the support frame and having a first end, a second end, and a cutting sleeve support surface disposed between the first and second ends, at least a first and a second removable cutting sleeve configured to slide over the cutting sleeve support surface of the drive shaft, each of the first and second removable cutting sleeves having first and second axial ends and an outer cutting surface portion defining at least a portion of the outer cutting surface of the cutting roller assembly, each of the first and second of removable cutting sleeves having at least a first engagement portion disposed on at least one of the first and second axial ends and configured to receive or transmit torque, a first torque transfer member fixed to the drive shaft and comprising a second engagement portion engaged with the first engagement portion of the first removable cutting sleeve.

In yet additional embodiments, a dough sheeting device can comprise a support frame having a first side member and a second side member, the second side member comprising a cutting roller access aperture, a drive shaft rotatably supported by the support frame and having a first end, a second end, and a cutting sleeve support surface disposed between the first and second ends, at least a first removable cutting sleeve configured to slide over the cutting sleeve support surface of the drive shaft.

In yet additional embodiments, a cutting roller assembly for a dough sheeting device, the cutting roller assembly can comprise a drive shaft rotatably supported by the support frame and having a first end, a second end, and a cutting sleeve support surface disposed between the first and second ends, at least a first removable cutting sleeve configured to slide over the cutting sleeve support surface of the drive shaft.

In yet additional embodiments, a removable cutting sleeve for a cutting roller assembly of a dough sheeting device, the removable cutting sleeve can comprise a cutting sleeve body comprising a longitudinal axis, a first end portion, a second end portion, an outer cutting surface and an inner passage comprising an inner surface, the outer cutting surface configured for cooperation with a roller of a dough sheeting device for cutting dough, the inner passage sized to slide over the cutting sleeve support surface of a cutting roller shaft of a dough sheeter, a first torque transfer portion disposed on the first end portion of the cutting sleeve body and configured to receive torque for rotating the cutting sleeve body about the longitudinal axis.

In yet additional embodiments, a removable cutting sleeve for a cutting roller assembly of a dough sheeting device, the removable cutting sleeve can comprise a cutting sleeve body comprising a longitudinal axis, a first end portion, a second end portion, an outer cutting surface and an inner passage comprising an inner surface, the outer cutting surface comprising raised edges surrounding recess and configured for cooperation with a roller of a dough sheeting device for cutting dough, the inner passage sized to slide over the cutting sleeve support surface of a cutting roller shaft of a dough sheeter.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

FIG. 11 is perspective view of one end of a removable cutting sleeve;

FIG. 12 is a perspective view of a right-side of a torque transfer ring in the assembly of FIG. 10;

FIG. 13 is a perspective view of a left-side of a torque transfer ring in the assembly of FIG. 12;

DETAILED DESCRIPTION

Embodiments of the disclosure will now be described with reference to the accompanying figures. The terminology used in the description presented herein is not intended to be interpreted in any limited or restrictive manner, simply because it is being utilized in conjunction with a detailed description of certain embodiments of the disclosure. Furthermore, embodiments of the disclosure may include several novel features, no single one of which is solely responsible for its desirable attributes or which is essential to practicing the embodiments of the disclosure herein described. For purposes of this disclosure, certain aspects, advantages, and novel features of various embodiments are described herein. It is to be understood that not necessarily all such advantages may be achieved in accordance with any particular embodiment. Thus, for example, those skilled in the art will recognize that one embodiment may be carried out in a manner that achieves one advantage or group of advantages as taught herein without necessarily achieving other advantages as may be taught or suggested herein.

Although the various embodiments disclosed herein may have specific relevance to tortilla sheeters, the features, advantages, and other characteristics disclosed herein may have direct or indirect applicability in other applications, such as, for example, in other types of food product sheeters, mechanical devices, and/or the like.

The inventions disclosed herein have applicability to sheeters used in conjunction with continuously moving conveyor systems. However, an understanding of the inventions disclosed herein is facilitated with the following description of the application of the principles of the present inventions to dough rolling, and in particular, rolling dough into tortillas and tortilla chips. In some embodiments, the inventions disclosed herein can be used in conjunction with sheeters that have a sheet thickness control system, such as those disclosed in U.S. Pat. Nos. 5,470,599, and 8,740,602, the entire contests of both of which are hereby incorporated by reference.

Figure 1:
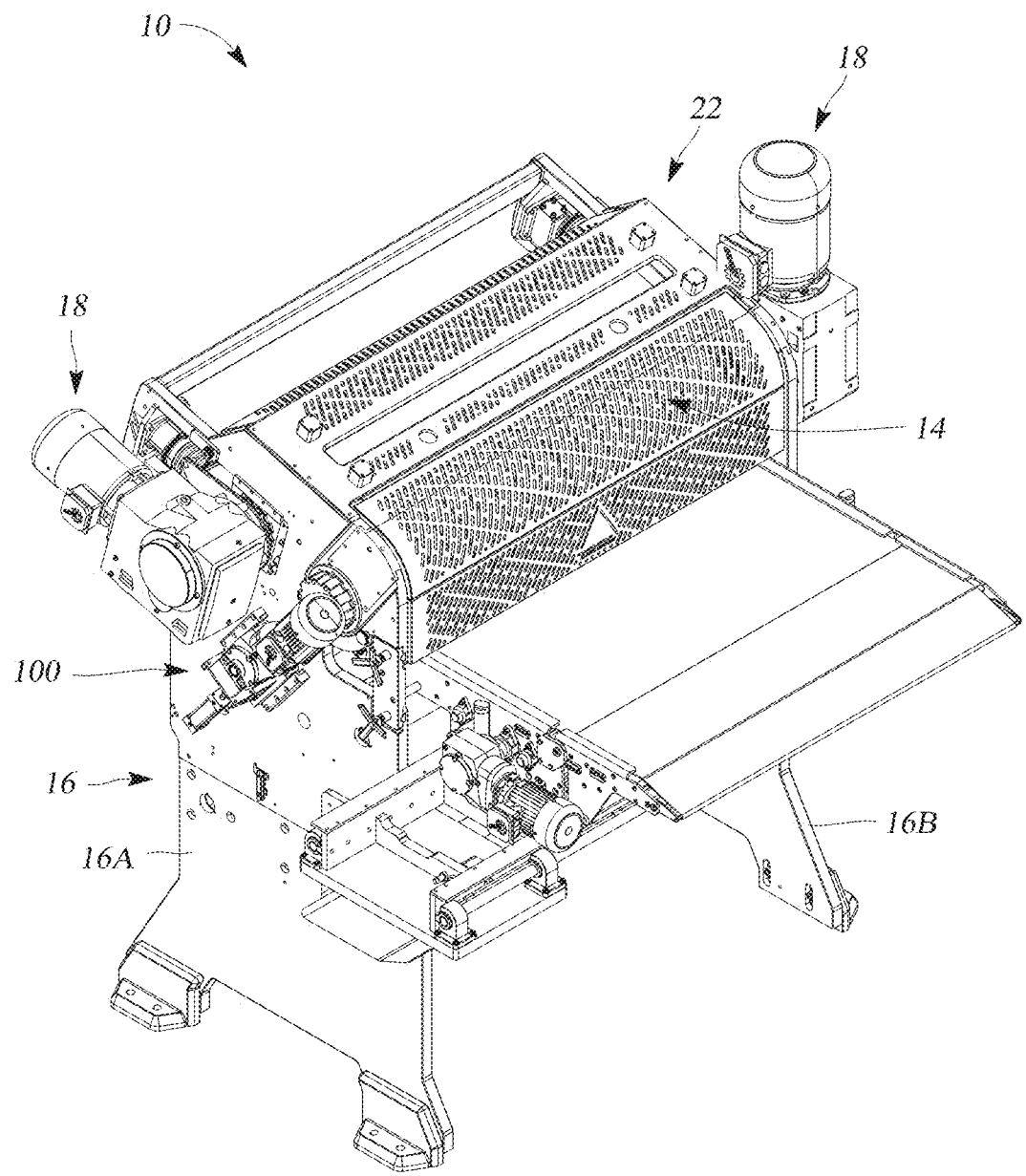
FIG. 1 is a top, front, and right-side perspective view of an embodiment of a sheeter with an improved cutting roller assembly.
Figure 2:
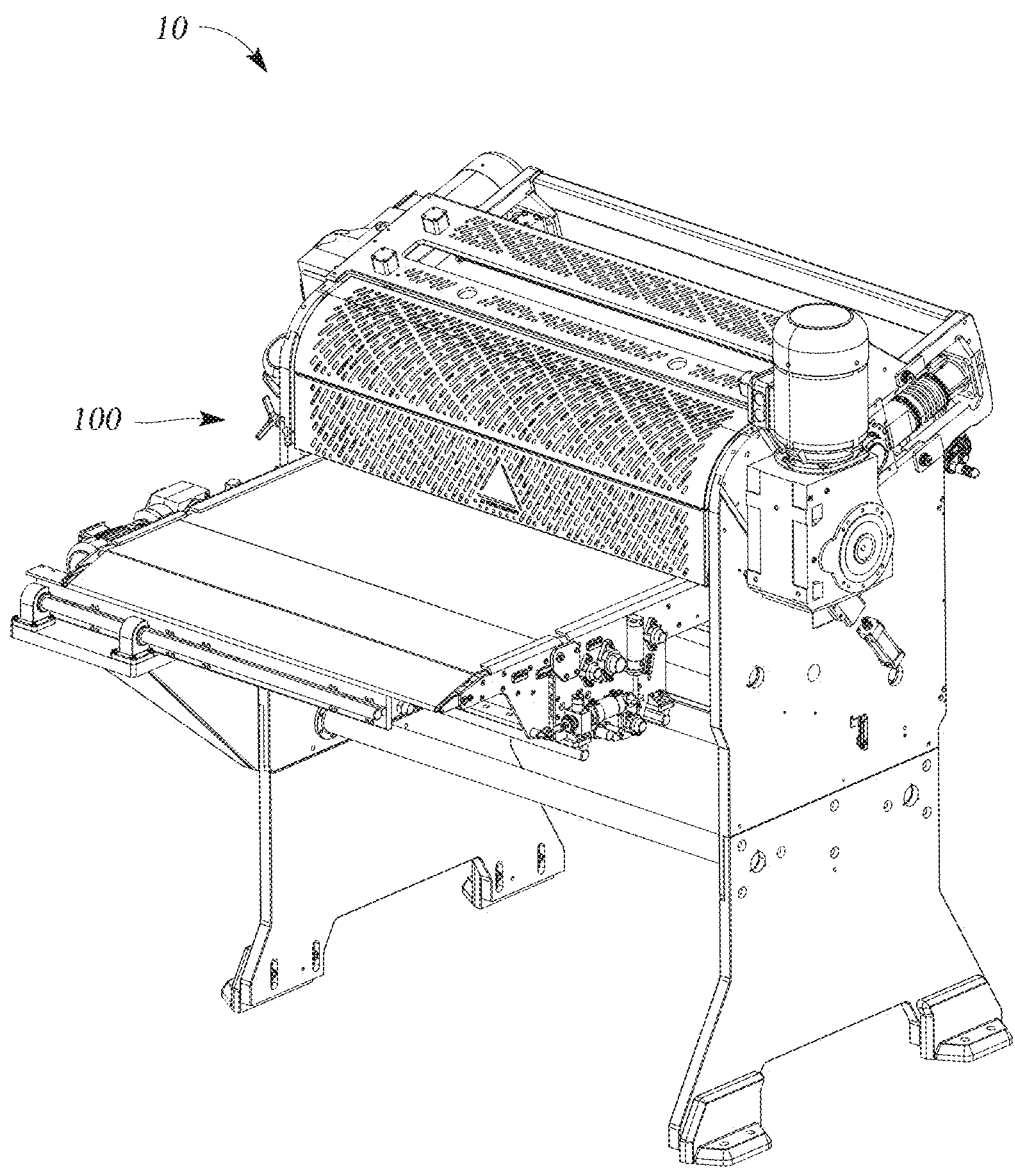
FIG. 2 is a top, front, and left-side perspective view of the sheeter of FIG. 1.
Figure 3:
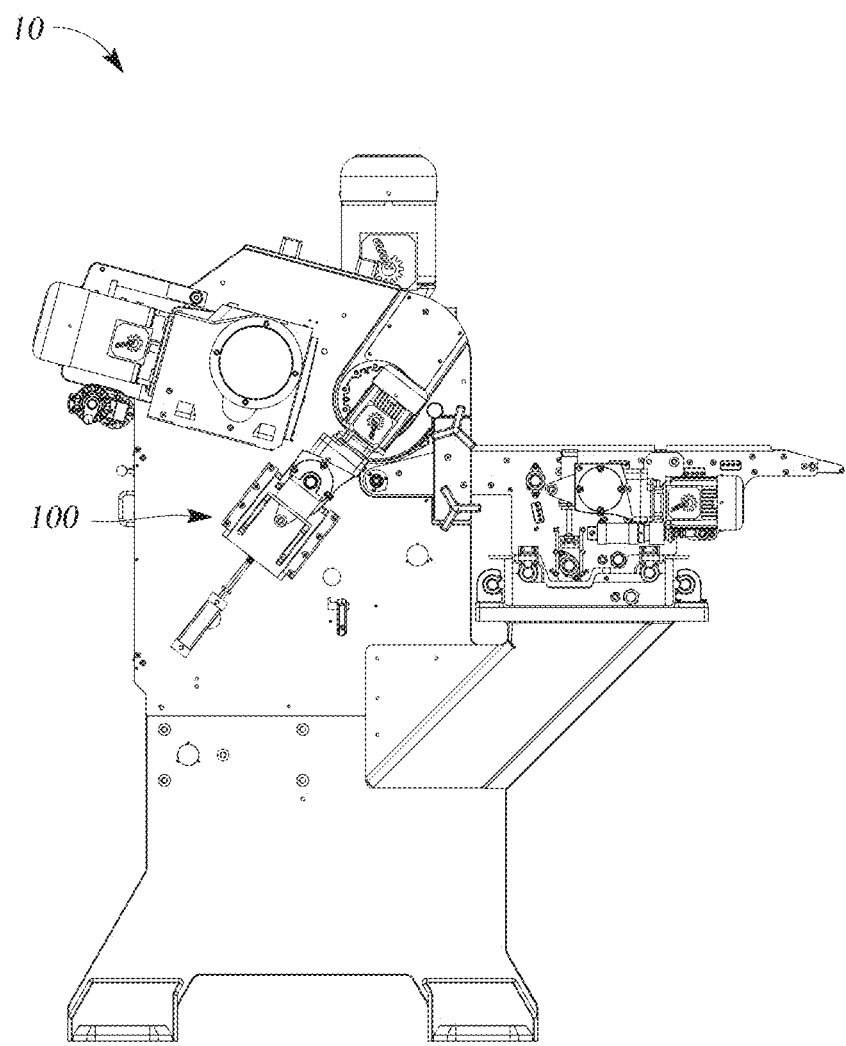
FIG. 3 is a left-side elevational view of the sheeter of FIG. 1.

FIG. 1 illustrates a tortilla sheeter 10 having a cutting roller assembly 100 with removable cutting sleeve. The tortilla sheeter 10 is in the configuration for tortilla production, and can include various types of electronic thickness control, pinch point gap control, and other related systems and functionality. The inventions disclosed herein have applicability to a variety of different types of food rolling machines and sheeters, however, tortilla sheeters, such as the sheeter 10 the basic understanding of which provides useful context for appreciation of the inventions disclosed herein.

With continued reference to FIG. 1, the sheeter 10 includes a roller assembly 14 and a support frame assembly 16. The support frame assembly 16 is in the form of a housing which can include and support various types of devices for operations of the sheeter 10. In the present embodiment, the support frame assembly 16 includes a right-side plate member 16A and a left-side plate member 16B. The roller drive assembly 14 can include electric motors 18 and an appropriate gear reduction mechanism for driving a shaft of one or both of the rollers. The roller assembly 14 is attached to the support frame assembly 16. Additionally, a hopper assembly 22 is supported above the rollers of the roller assembly 14.

Figure 5:
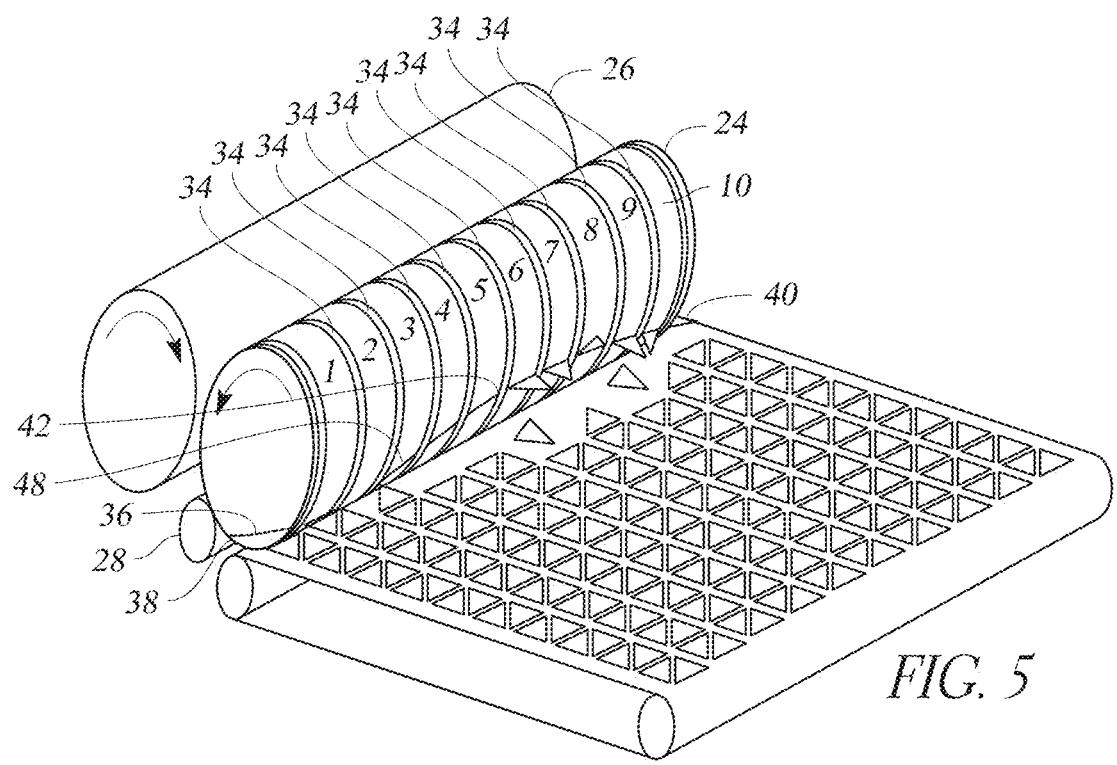
FIG. 5 is a schematic representation of a front, rear, and cutter roller within the sheeter of FIG. 1.
Figure 6:
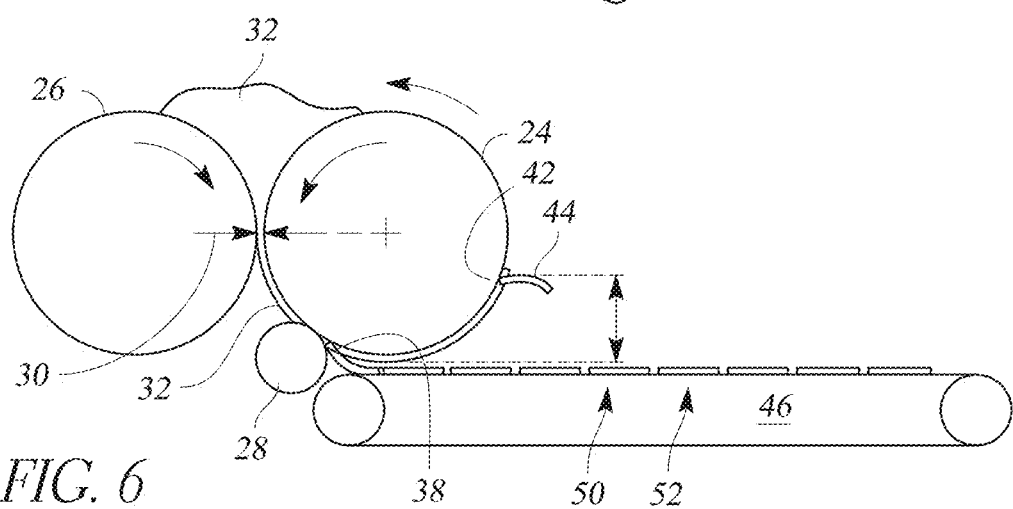
FIG. 6 is a schematic side elevational view of the roller arrangement of FIG. 5 illustrating an operation of a stripper wire illustrated in FIG. 5.

With continued reference to FIGS. 5 and 6, the roller drive assembly 14 also includes a generally cylindrical front roller (aka "exit roller") 24 and a generally cylindrical rear roller 26. The rollers 24, 26 can have a slightly roughened surface (obtained, for example, with sandblasting). The rollers 24, 26 are rotated in opposite directions and can be driven at the same speed or slightly different speeds, depending on desired performance characteristics. The rollers 24, 26 are positioned generally parallel to each other.

Figure 4:
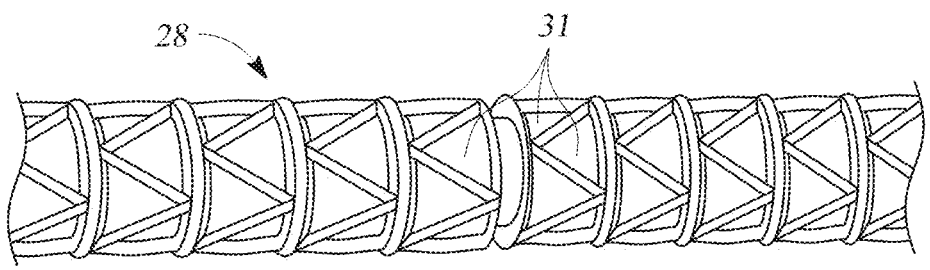
FIG. 4 is a cutting roller that can be incorporated into the sheeter of FIG. 1.

With reference to FIG. 4, the cutting roller assembly 100 can include a cutting roller 28 comprising a shaft and one or more removable cutting sleeves, described in greater detail below with reference to FIGS. 7-22. The cutting roller 28 is in the form of a cutting roller designed for tortilla chip manufacturing, and thus includes triangular-shaped raised edges 29 and recesses 31 (also referred to as "cutting guides") for cutting triangular pieces of dough. The cutting roller 28 is also mounted within the roller drive assembly 14.

With reference to FIGS. 5 and 6, the rollers 24, 26 are mounted parallel to each other to define a pinch point gap 30. The hopper assembly 22 (FIG. 1) is mounted above the rollers 24, 26 so as to support dough, such as masa 32 above the pinch point gap 30. As such, as the rollers 24, 26 are driven in counter-rotating directions, the masa 32 is pulled into the pinch point gap 30. A thin layer of dough 32 is discharged form the pinch point gap and adhered to an outer surface of the exit roller 24. As the sheet of dough 32 moves counter-clockwise along with the exit roller 24 (as viewed in FIG. 5), it is passed between the cutting roller 28 and the outer surface of the exit roller 24. The cutting roller 28 cuts the dough sheet 32 into desired shapes. In the illustrated prior art device, the dough is cut into triangular shaped pieces of dough for making tortilla chips. Other types of cutting rollers can also be used.

The exit roller 24 also includes a plurality of grooves, in which bands 34 are disposed. The grooves have an inner surface that has a smaller diameter than the inner surface of the bands 34. The bands are sufficiently large that they can be pulled approximately parallel or slightly projecting from the outer surface of the roller 24.

A stripper wire 36 is secured to the roller assembly 14 at locations adjacent to both ends of the front roller 24 and downstream from the cutting roller 28. More specifically, the stripper wire 36 is mounted at the right end of the front roller 24 adjacent to the right-most point of contact 38 and secured at the left end of the roller 24 adjacent to the left-most point of contact 40. The stripper wire is threaded under the bands 34. As such, the stripper wire can strip off cut pieces of dough from the outer surface of the front roller 24 yet allow remaining pieces of dough, referred to as "rework", to remain in contact with the bands 34 and be fed back into the hopper so as to become reworked with the dough 32 above the pinch point gap (FIG. 6).

With reference to FIG. 5, during operation, the rotation of the roller 24 (counter-clockwise in FIGS. 5 and 6) and the resulting friction between the stripper wire 36 and the outer surface of the roller 24 and the bands 34 (which rotate with the roller 24) causes the stripper wire 36 to be pulled in the counterclockwise direction. As such, the stripper wire tends to follow an arched shape around the front roller 24. For example, as shown in FIG. 5, the right-most point of contact 38 of the stripper wire 36 and the outer surface of the front roller 24 is close to the cutter roller 28. However, towards the center of the front roller 24, the stripper wire 36 is pulled up to an apex 42 which is at the highest point of contact 42 between the stripper wire 36 and the outer surface of the roller 24. The stripper wire 36 can break, which requires a user to access the space at the discharge side of the front roller 24 and the stripper wire mount points for appropriate repairs.

With continued reference to FIGS. 5 and 6, the difference in height between the right-most contact point 38 and the apex 42 causes individually cut pieces of dough 44 to be separated and fall away from the outer surface of the front roller 24 at different heights. For example, triangular pieces of dough discharge from the front roller 24 near the contact point 36 are dropped immediately down onto an output conveyor assembly 100. At an intermediate contact point 48 between the contact points 36 and 42, the cut pieces of dough fall a distance 50 from the outer surface of the roller to the output conveyor 46. Further, at or near the contact point 42, the cut pieces of dough fall a greater distance 52 which is much greater than the distance 50, onto the output conveyor 100. The higher the contact point 42, the larger the distance 52.

Figure 7:
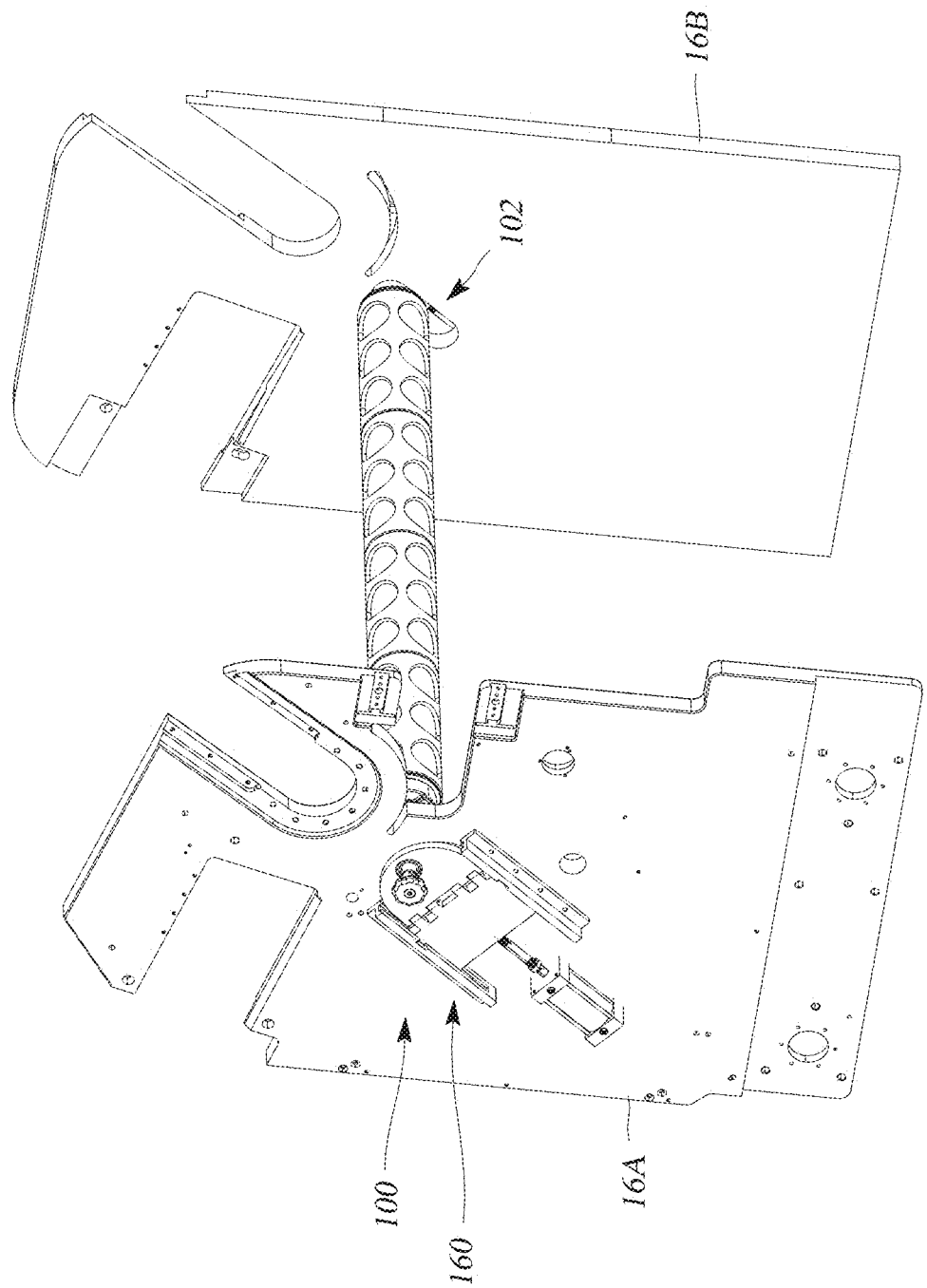
FIG. 7 is a top, front, and right-side perspective view of the embodiment of FIG. 1, with certain components removed.
Figure 8:
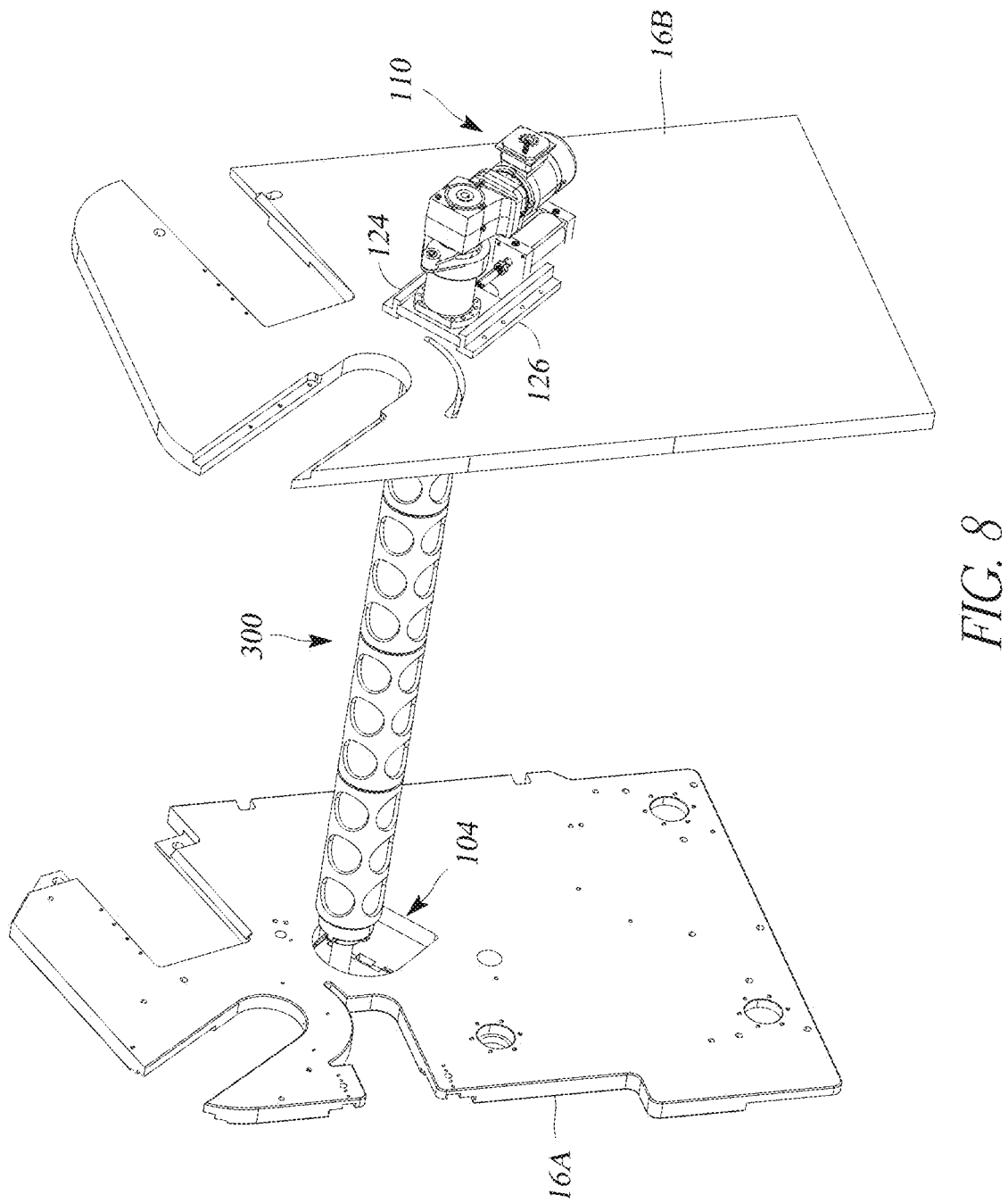
FIG. 8 is a top, front, and left-side perspective view of the embodiment of FIG. 7, with certain components removed.

With reference to FIGS. 7 and 8, the cutting roller assembly 100 is supported by the right and left side plate members 16A, 16B. The left-side plate member 16B includes a slot 102 that is sized to allow for adjustment of the position of the cutting roller assembly 100. The right-side plate member 16A includes an access aperture 104 that is sized to coincide with the slot 102 but also to be large enough for the entire cutting roller assembly 100 to pass therethrough. The cutting roller assembly 100 includes a drive assembly 110 and an access assembly 160.

Figure 9:
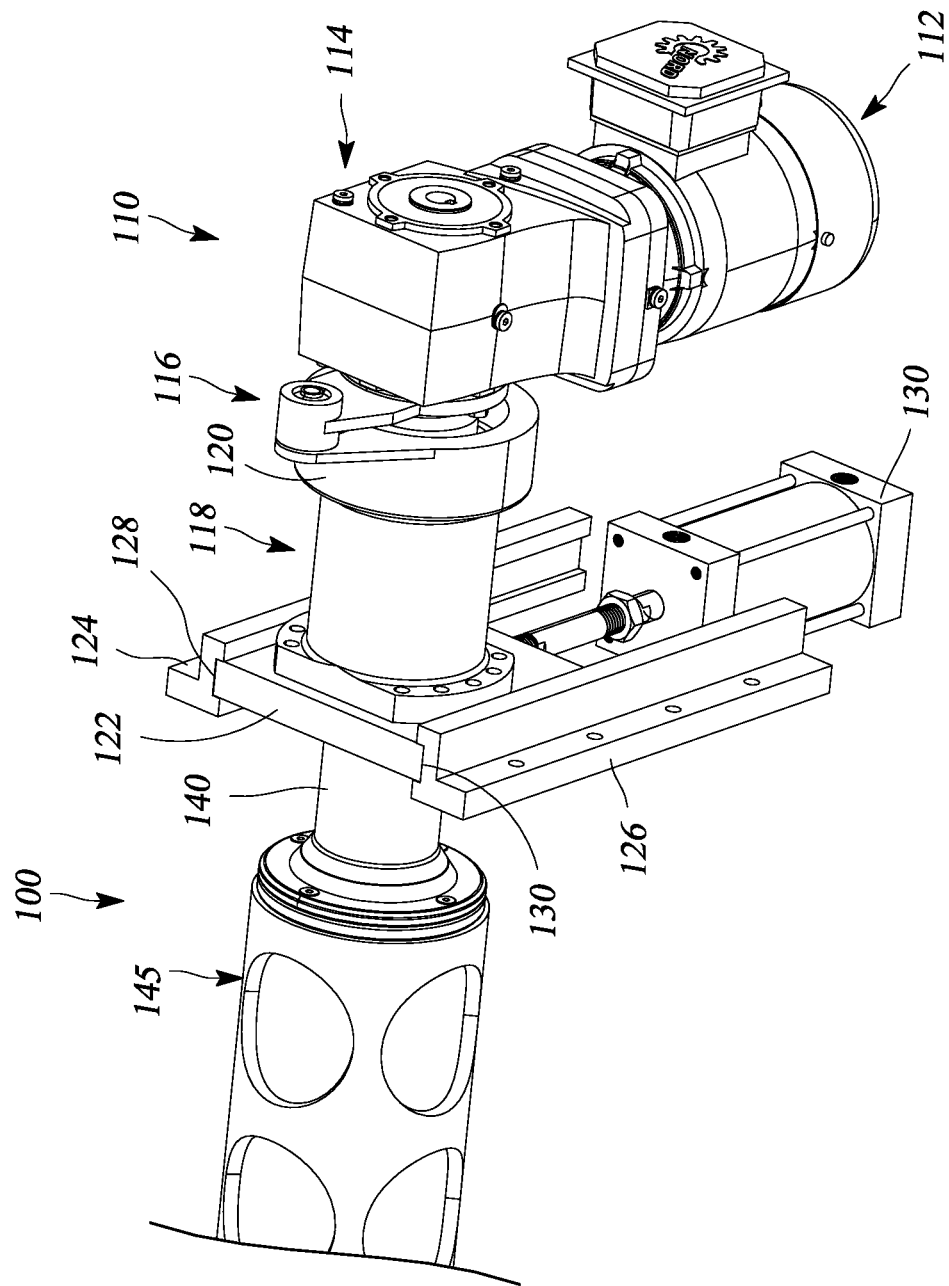
FIG. 9 is an enlarged perspective view of a drive and bearing support assembly of the cutting roller assembly, with the left-side plate of the frame removed.

With reference to FIG. 9, the drive assembly 110 can include a drive motor 112 and a gear unit 114 that can include a right-angle arrangement of gears as well as a gear ratio reduction. Additionally, the drive assembly 110 can include an anti-rotation mount point 116 for preventing the rotation of the motor 112 and the gear unit 114 relative to the support frame assembly.

The drive assembly 110 also includes a bearing assembly 118 that can include a bearing offset housing 120, inside of which are a plurality of bearing sets. The bearing assembly 118 can be configured with sufficient strength to support the cutting roller assembly 100 in a cantilevered manner. Any appropriate arrangement of bearings can be used.

The bearing offset housing 120 can be mounted to a guide plate 122. The guide plate 122 can be slidingly engaged with a pair of guide rails 124, 126 that can be secured to the left-side plate 16B (FIG. 8) of the support frame assembly 16. For example, the guide rails 124, 126 can include a guide groove 128, 130 and the guide plate 122 can be sized to fit within the grooves 128, 130 so as to be moveable along the longitudinal length of the grooves 128. An adjustment actuator 130 can be connected to the guide plate 122 for moving the guide plate 122 and thus the entire drive assembly 110 upward and downward for achieving different spacings between the cutting roller assembly 100 and the exit roller 24. For example, the actuator 130 can be any type of actuator, including, but without limitation, a jackscrew actuator. Additionally, the actuator 130 can be aligned to move the guide plate 122 so as to adjust the position of the cutting roller assembly 100 along the slot 102 (FIG. 7).

The cutting roller assembly 100 can include a drive shaft 140 and a removable cutting sleeve assembly 145. The driveshaft 140 can extend through the bearing assembly 118 and into the drive assembly 110 such that the motor 112 can drive the driveshaft 140.

With reference to FIGS. 10-13, optionally, the driveshaft 140 can transfer torque from the motor 112 to the cutting sleeve assembly 145 through a torque transfer member 142. For example, but without limitation, the torque transfer member 142 can include at least one engagement member and the cutting sleeve assembly 145 can include one or more engagement members configured engage with the engagement member on the torque transfer sleeve 142 so that they are rotationally coupled together and thus torque can be transmitted from the torque transfer member 142 into a sleeve 150 of the cutting sleeve assembly 145.

With reference to FIGS. 10-13, optionally, the driveshaft 140 can transfer torque from the motor 112 to the cutting sleeve assembly 150 through a torque transfer member 142. For example, but without limitation, the torque transfer member 142 can include at least one engagement member and the cutting sleeve assembly 150 can include one or more engagement members configured engage with the engagement member on the torque transfer sleeve 142 so that they are rotationally coupled together and thus torque can be transmitted from the torque transfer member 142 into the sleeve 150.

For example, but without limitation, the driveshaft 140 can include a flange member 144 fixed to the driveshaft 140. A plurality of fasteners 146 can be used to secure the drive flange 144 to the torque transfer member 142, for example, with threaded fasteners extending through holes 148.

In the illustrated embodiment, the torque transfer member includes a plurality of protrusions 149 extending radially from a collar 151.

The cutting sleeve 150 can include raised edges and recessed in an arrangement appropriate for cutting the desired dough shapes. In the illustrated embodiment, the cutting sleeve 150 includes round raised edges and recesses for cutting tortillas. Other arrangement can also be sued.

In some embodiments, the cutting sleeve 150 includes a central bore 152, an increased inner diameter portion 154 that has a larger diameter than the inner bore 152. Additionally, the sleeve 150 can include a plurality of recesses 156 that are configured to receive the protrusions 149. The inner surface of the enlarged diameter portion 154 can be sized to receive the outer surface of the collar 151. Thus, when engaged together, the protrusion 149 and recesses 156, cooperate to transmit torque from the driveshaft 140, through the drive flange 144, to the torque transfer member 142, and into the sleeve 150. The diameter of the inner bore 152 can be sized to provide a close fit with the outer surface 158 of the driveshaft 140 and to allow for a relative sliding therebetween.

Figure 14:
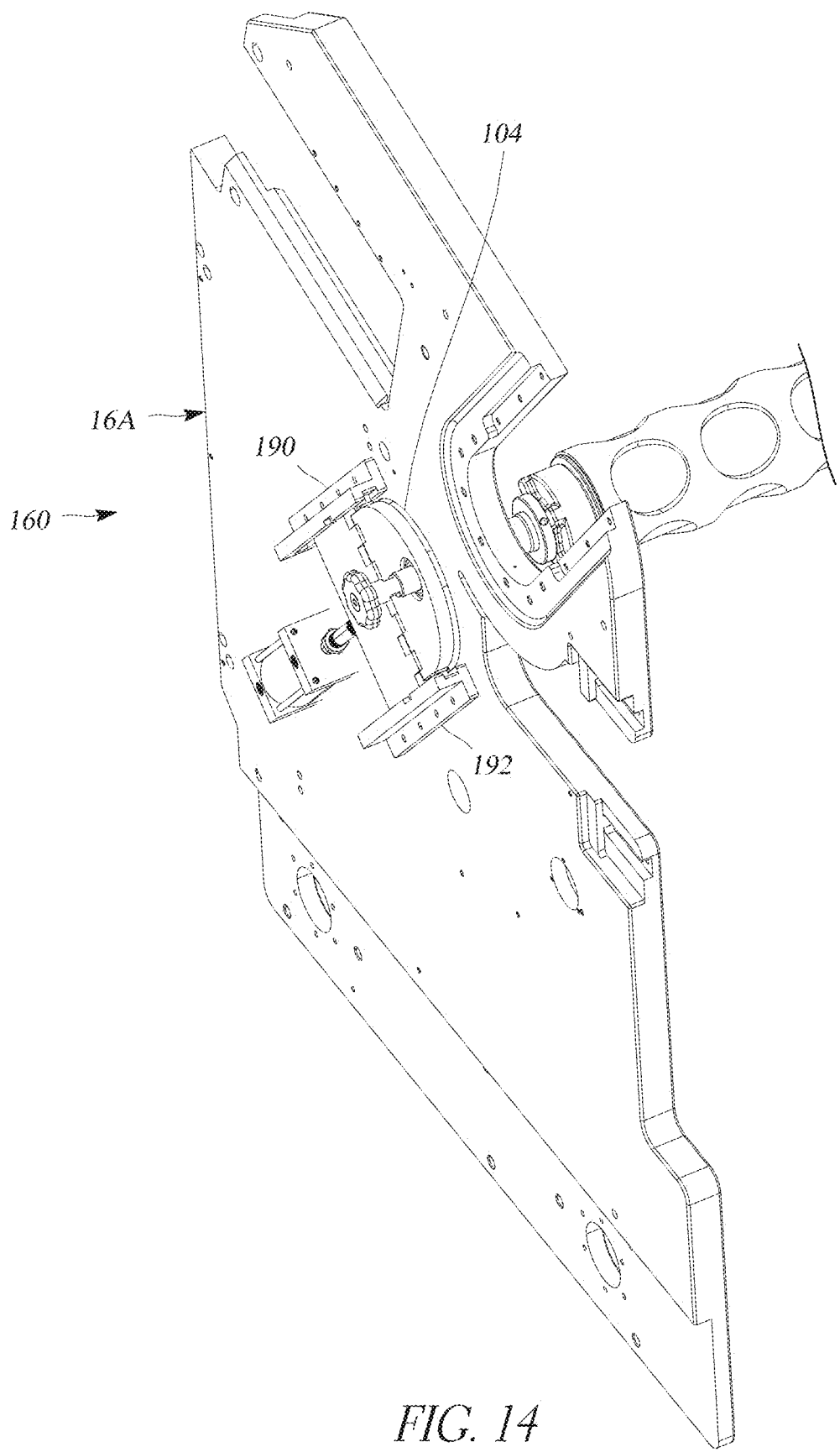
FIG. 14 is a perspective view of an access door assembly for the cutting roller.
Figure 15:
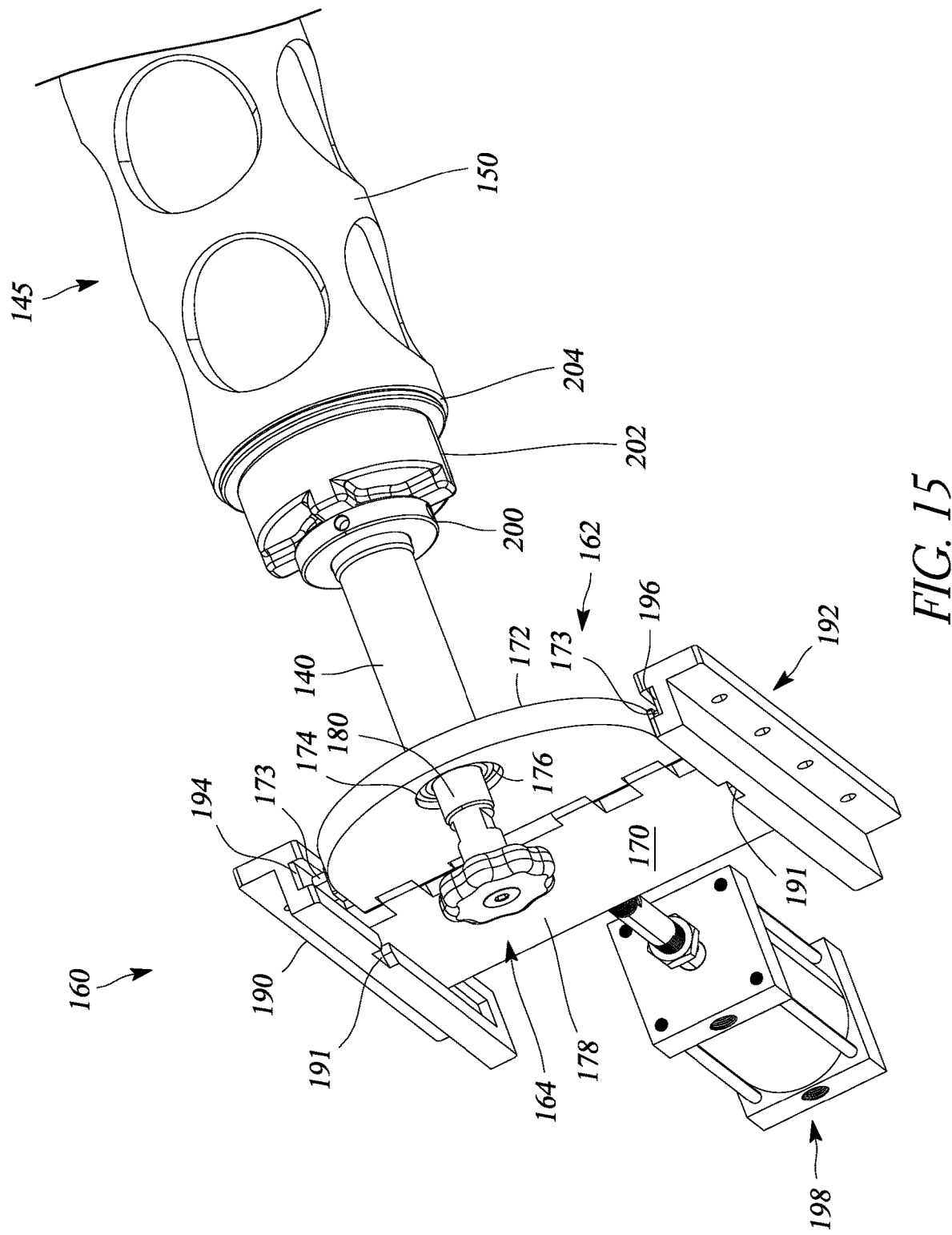
FIG. 15 is an enlarged perspective view of the assembly of FIG. 14 with the right-side plate member of the frame removed.

With reference to FIGS. 14 and 15, the access assembly 160 includes an access door member 162 and a removeable mandrel member 164. The access door 162 can comprise a guide plate portion 170 and a pivotable access door 172. The access door 172 can include a bearing mount aperture 174 supporting a bearing 176 therein.

The removable mandrel 164 can include a knob portion 178 and a shaft 180 having a threaded end engaged with a threaded bore with the terminal end of the driveshaft 140. The outer surface of the mandrel portion or shaft 180 is supported by the bearing 176 in use. The guide plate portion 170 can be supported by guide rails 190, 192 that are mounted on either side of the aperture 104 (FIG. 14). The guide rails 190, 192 can include guide grooves 194, 196, respectively, configured to slidingly receive side portions of the guide plate 170 for up and down movement.

The door portion 172 can be mounted so as to be moveable between opened and closed positions. For example, but without limitation, the upper edge of guide plate 170 can be hingedly connected to the door portion 172, for mounting the door portion 172 for pivotal movement between opened and closed positions. Additionally, door portion can include studs 173 that are sized to be slidable within the grooves 194, 196. While the studs 173 are captured within the grooves, 194, 196, the door portion 172 is held in the closed position.

An actuator 198 can be mounted to the right-side plate 16A for moving the guide plate 170 and the door 172 upward or downward for proper alignment of the cutting roller assembly 100 during use. Additionally, the guide plate 170 can be moved downward and the door 172 can be pivoted outwardly to expose a sufficient portion of the aperture 140 to allow for removal of the sleeve 150.

Figure 16:
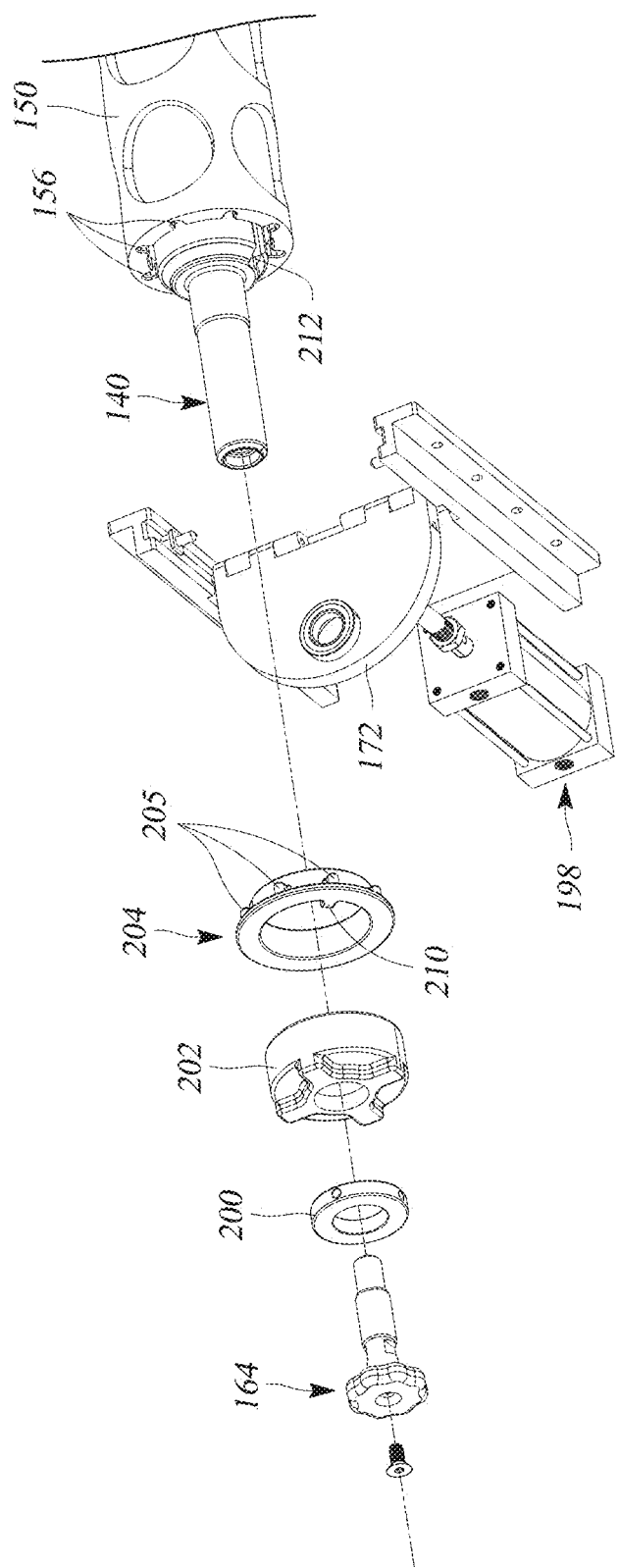
FIG. 16 is an enlarged perspective view of the assembly of FIG. 14, with the access door and with the assembly partially exploded.
Figure 17:
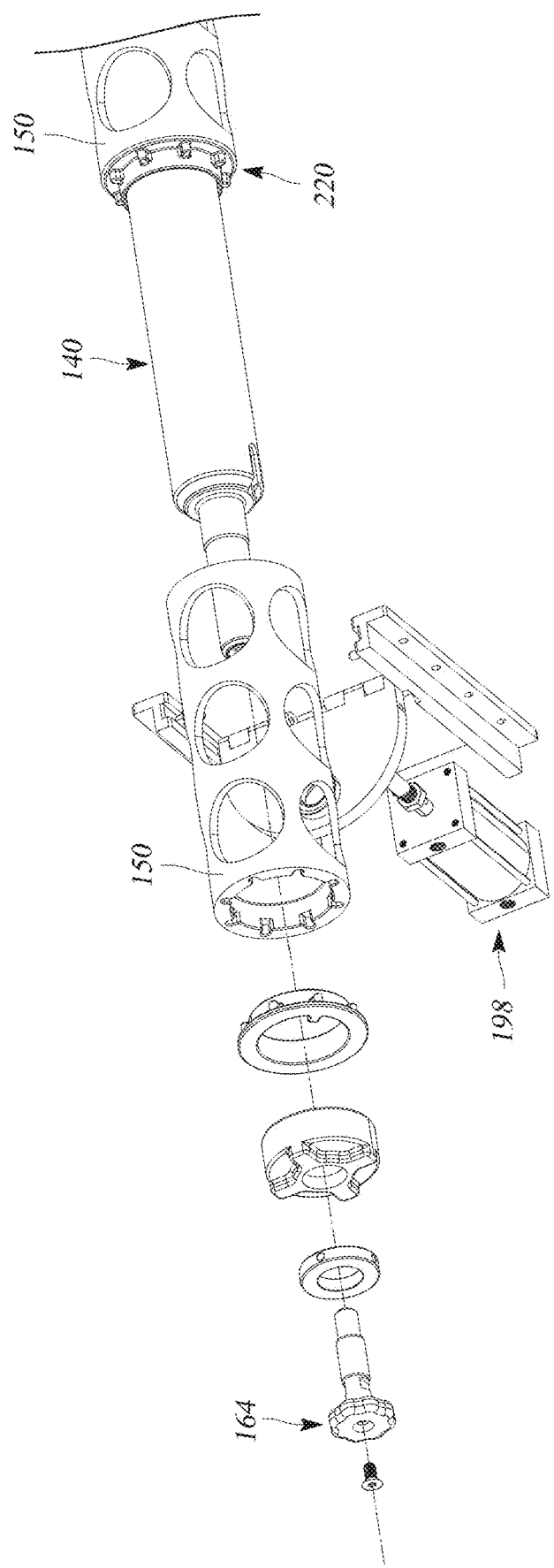
FIG. 17 is a further exploded view of the assembly of FIG. 16.

For example, with reference to FIGS. 16 and 17, the mandrel 164 can be disengaged from the driveshaft 140 thereby disconnecting the door 172 from the cutting roller assembly 100. As such, the actuator 198 can be actuated to pull the guide plate 170 downwardly until the studs 173 are aligned with exit grooves 191, thereby allowing the studs 173 to pass through the exit grooves 191 as the door portion 172 is pivoted about its hinged connection to the guide plate 170 and thus opened and providing access to the cutting roller assembly 100 through the aperture 104. With the door portion 172 in the opened position as such, additional parts can be removed.

Figure 10:
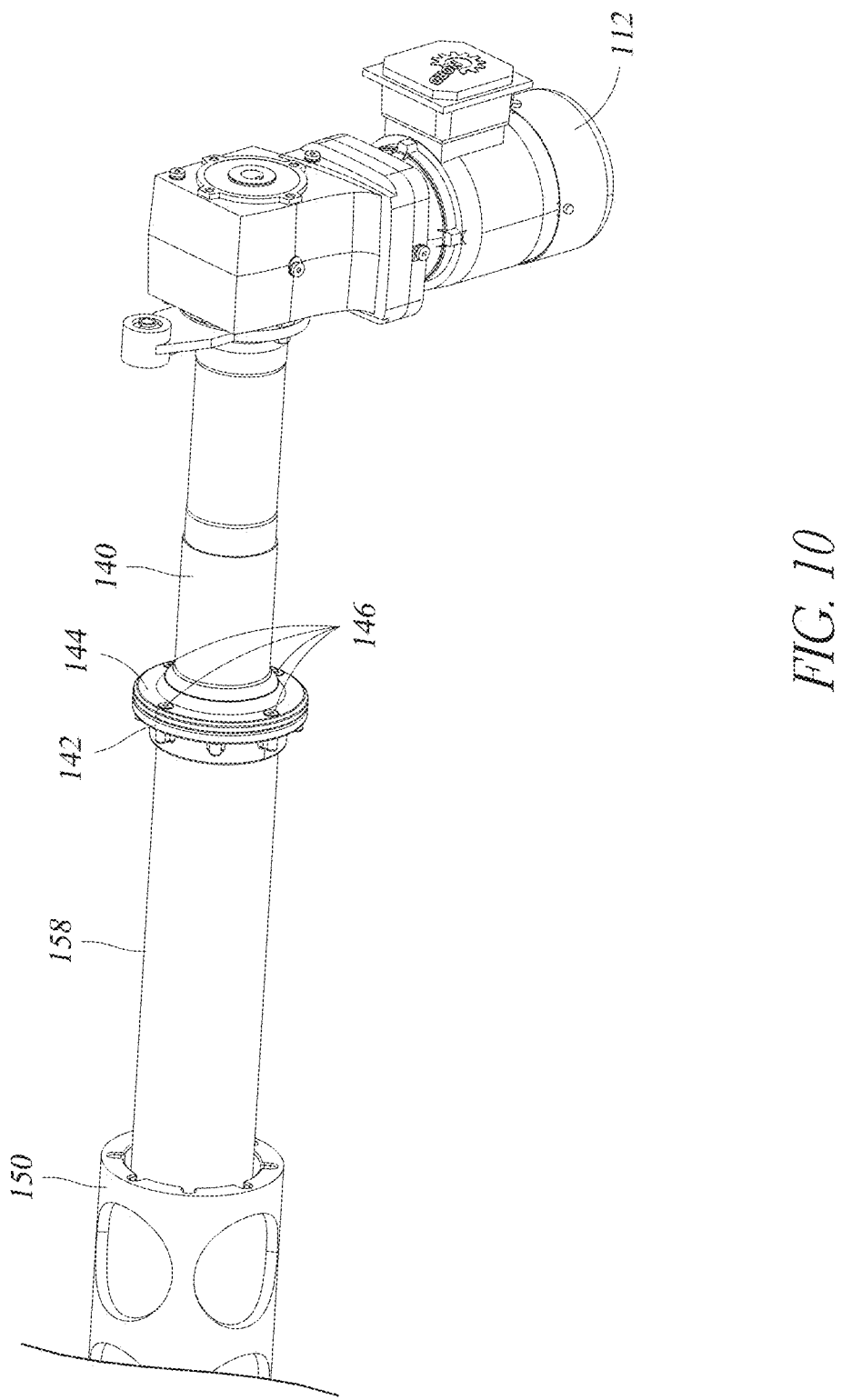
FIG. 10 is another enlarged view of the cutting roller assembly of FIG. 9, with the bearing support assembly removed.

For example, a locking collar 200, compression member 202, and a torque transfer member 204 can be removed from the driveshaft 140. The locking collar 200 can include one or more set screws for securement to a portion of the driveshaft 140. The compression member 202 can be configured to be compressible and thus act as a spring for providing a continuous pressing force between the locking collar and all of the components between the locking collar 200 and the drive flange 144 (FIG. 10). As such, the locking collar 200 and compression member 202 provide for transferring an axial force from the collar 200 to the torque transfer member 204 to ensure secure engagement with the sleeve 150.

The torque transfer member 204 can have similar or the same construction as the torque transfer member 142 of FIGS. 12-13. Optionally, additionally, the torque transfer member 204 includes an additional protrusion 210 configured to act as a "key" and the driveshaft 140 can include a keyway 212 configured to receive the key 210. As such, torque from the driveshaft 140 can pass to the torque transfer member 204.

The protrusions 205 of the torque transfer member 204, which can be the same as the protrusions 149 of the torque transfer member 142, can engage via corresponding recess 156 on the sleeve 150. As such, torque from the driveshaft 140 can pass through the keyway 212 to the protrusion 210, into to the torque transfer member 204, then into the sleeve 150 by way of the engagement of the protrusions 205 with the recesses 156.

With the mandrel 164, collar 200, compression member 202, and torque transfer member 204 removed from the driveshaft 140, the sleeve 150 can also be removed from the driveshaft 140.

With continued reference to FIG. 17, the assembly 100 can optionally include a number of individual sleeves 150, connected by way of intermediate torque transfer members 220. Intermediate torque transfer member 220 can include the same arrangement of protrusions such as those protrusions 149 and collar 151 on both sides to thereby engage with the recesses 156 of two sleeve members that are arranged in an end to end manner. Thus, with reference to FIG. 18, all of the sleeves 150 (four sleeves 150 illustrated in FIG. 18) have been removed from the driveshaft 140 along with the three intermediate torque transfer members 220.

As noted above, the drive assembly 110 is provided with the bearing assembly 118 that is sufficiently strong to support the driveshaft 140 in a cantilevered manner, thereby allowing the sleeves 150 to be removed from the driveshaft 140 through the access aperture 104 and through the access assembly 160. After removal of the sleeves 150, replacement sleeves (not shown) can then reinstalled on the driveshaft 140 and the access assembly 160 can be readjusted in a manner in the opposite sequence described above.

FIGS. 19-22 illustrate a modification of the cutting roller assembly 100, identified generally by the reference numeral 300. The cutting roller assembly 300 includes a drive end 302, an access end 304, and one or removeable cutting sleeves 350 secured to a driveshaft 340.

In some embodiments, the drive end 302 can be configured for being gear driven on the inside of the housing 16. For example, the driveshaft 340 can include a bearing support portion 342 configured to be supported by a bearing for example a bearing assembly 118 (FIG. 9). Additionally, the drive end 302 can include a driven gear 304 configured to be engaged with a drive gear (not shown) within the sheeter 10.

The driven gear 304 can be rotationally coupled with a torque transfer member 306. For example, the driven gear can be sandwiched between a spacer member 308 and a collar member 310 for securing driven gear onto the driveshaft 340. An end plate member 312 can be secured to the collar member 310.

The torque transfer member 306 can include a collar portion 320 and at least one engagement portion 322 configured to cooperate with an engagement portion 352 on the sleeve 350. For example, the engagement portion 322 can be in the form of a protrusion extending from the collar portion 320 and the engagement portion 352 can be a recess configured to receive the protrusion 322. In some embodiments the torque transfer member 306 can include a plurality of protrusions 322 and the sleeve 350 can include a corresponding plurality of recesses 352. In the illustrated embodiment, there are two protrusions 322 and two recesses 352 disposed 180° from each other.

The torque transfer member 306 can be secured to the spacer 308 with threaded fasteners and thus rotationally coupled with the driven gear 304. Additionally, the protrusions 322 can be received within the recesses 352, thereby transferring torque from the gear 304 to the torque transfer member 306 and into the sleeve 350.

Figure 18:
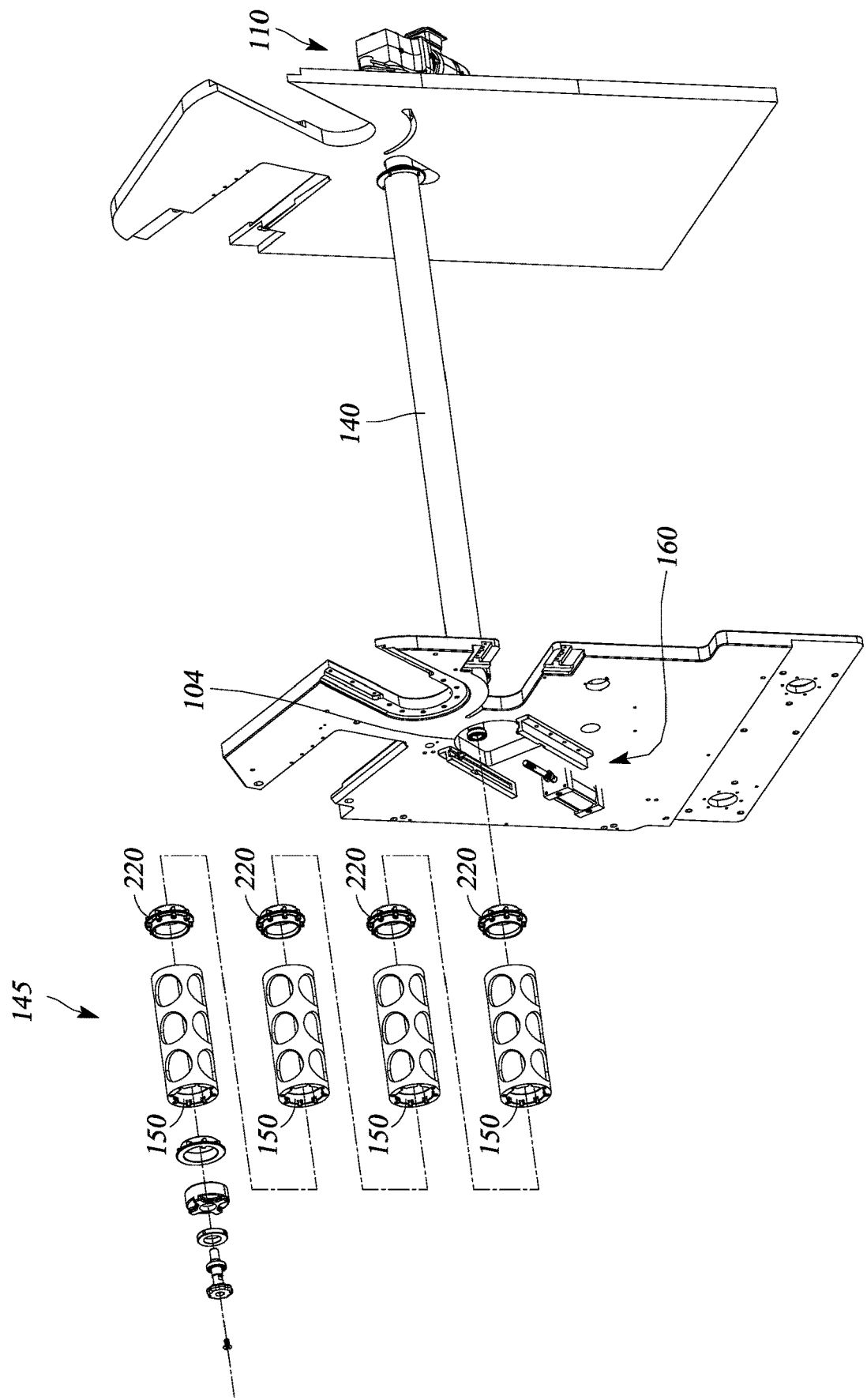
FIG. 18 is a further exploded view of the cutting roller assembly with the cutting sleeve fully removed from the driveshaft.
Figure 19:
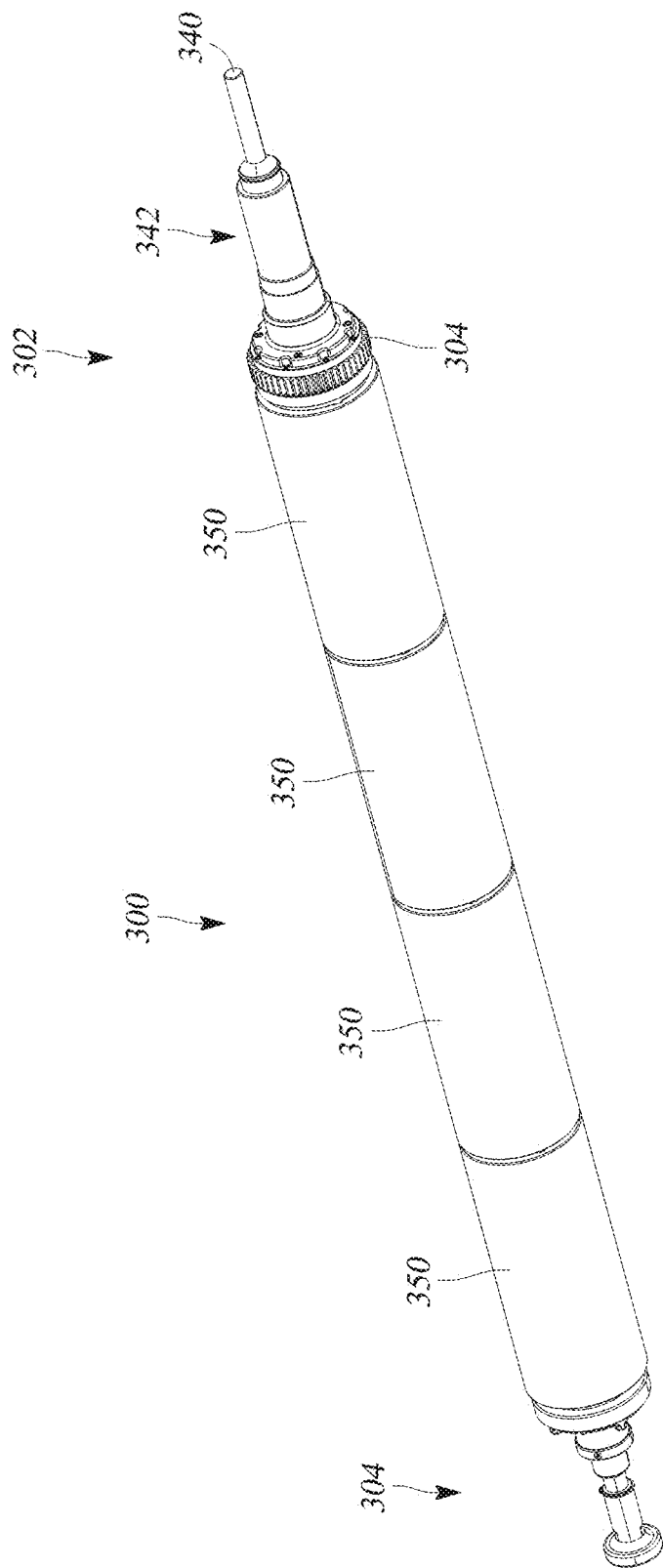
FIG. 19 is a perspective view of another embodiment of a cutting roller.
Figure 20:
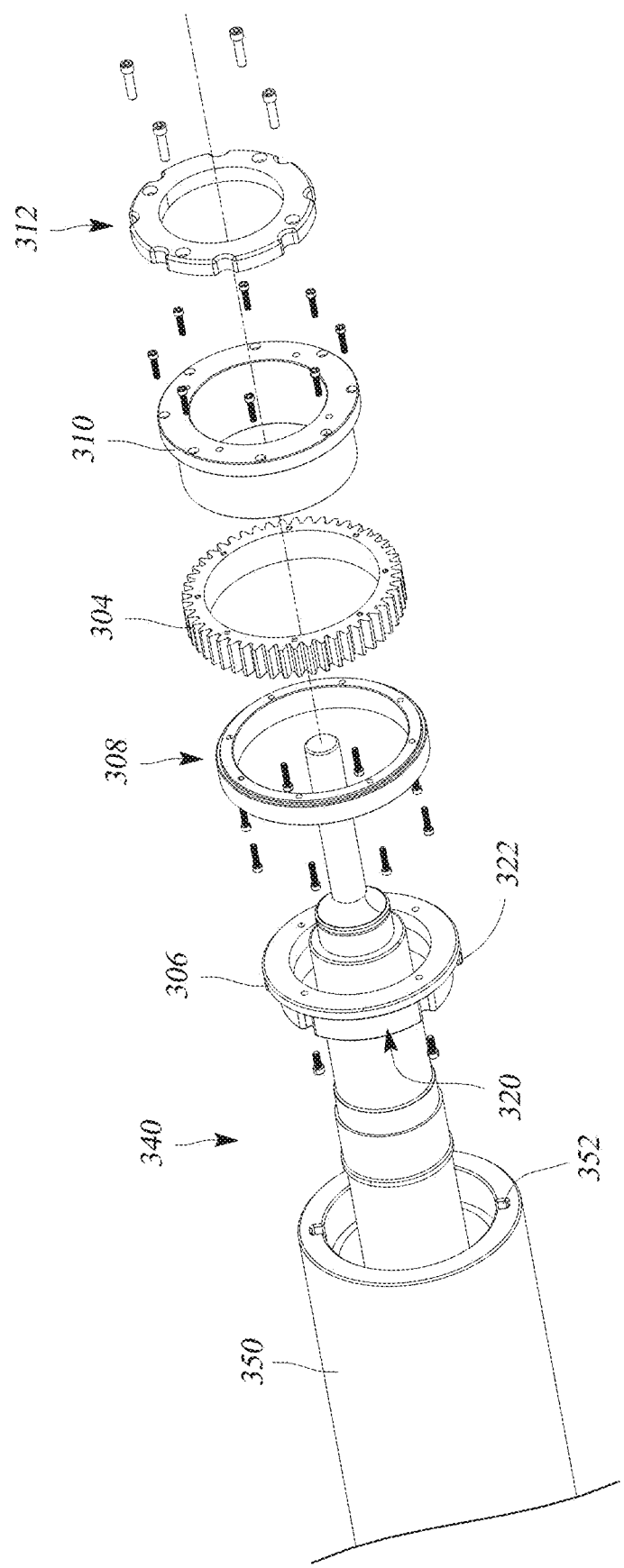
FIG. 20 is an enlarged and exploded view of the drive-end of the embodiment of FIG. 19.
Figure 21:
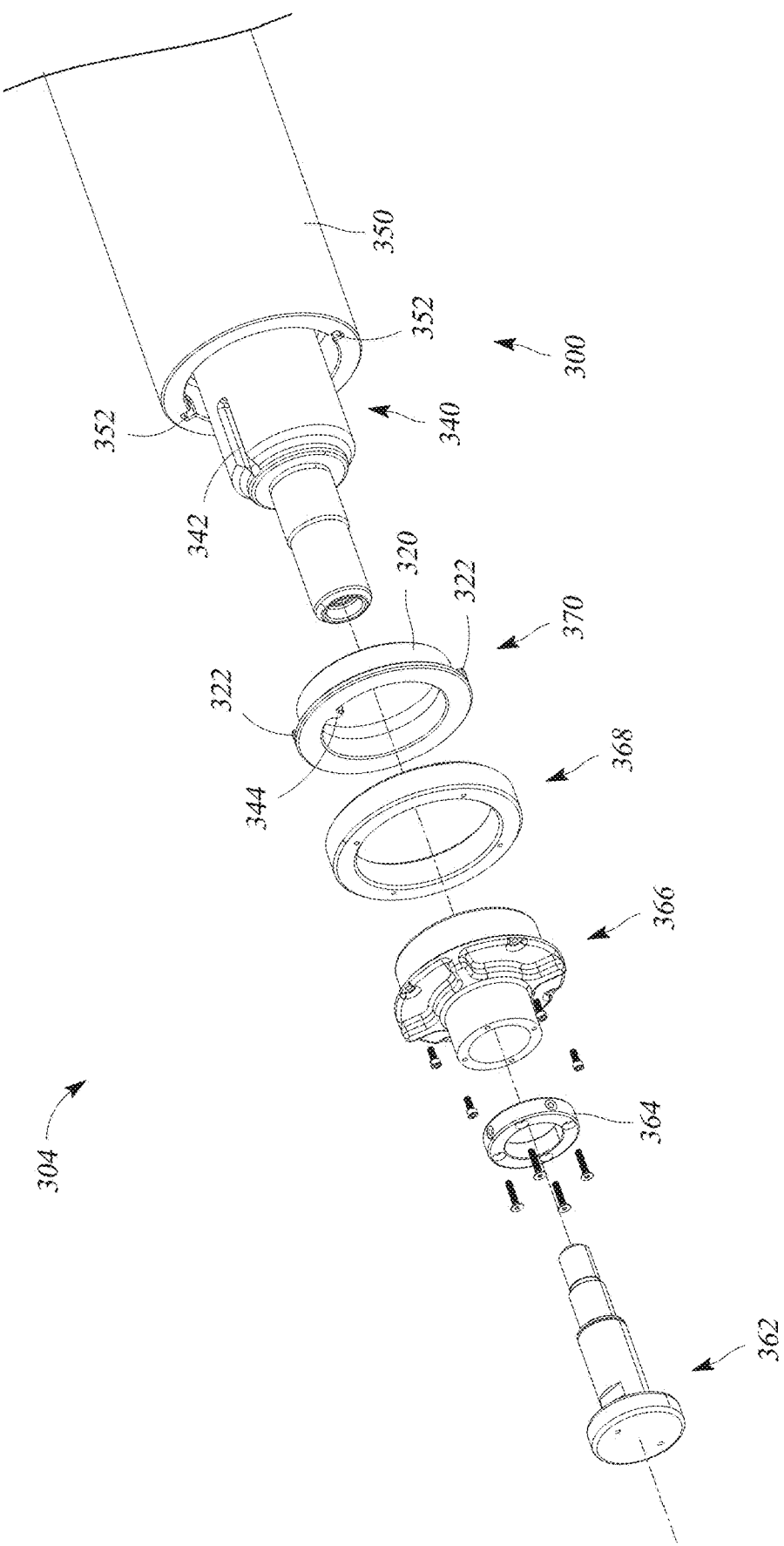
FIG. 21 is an enlarged perspective view of the access end of the embodiment of FIG. 19.

With reference to FIG. 21, the access end assembly 304 of the cutting roller assembly 300 can include an arrangement of components similar to that of the access assembly 160 (FIG. 18). For example, the access end 304 can include a removable mandrel 362, locking collar 364, a compression member 366, a spacer 368, and a torque transfer member 370.

As described above with reference to the torque transfer member 306, the torque transfer member 370 can include one or more protrusions 322, protruding from a collar portion 320. Additionally, the driveshaft 340 can include a keyway 342 configured to engage with another protrusion or "key" 344. Thus, rotation of the torque transfer member 322 is keyed to the driveshaft 340. Additionally, the protrusions 322 on the torque transfer member 370 can be received in the recesses 352 of the sleeve 350 and thus torque can be transferred from the torque transfer member 322 to the sleeve 350.

With the mandrel 362 removed, the guide plate 170 and door 172 can be moved to the open position as described with reference to FIGS. 15-17.

Figure 22:
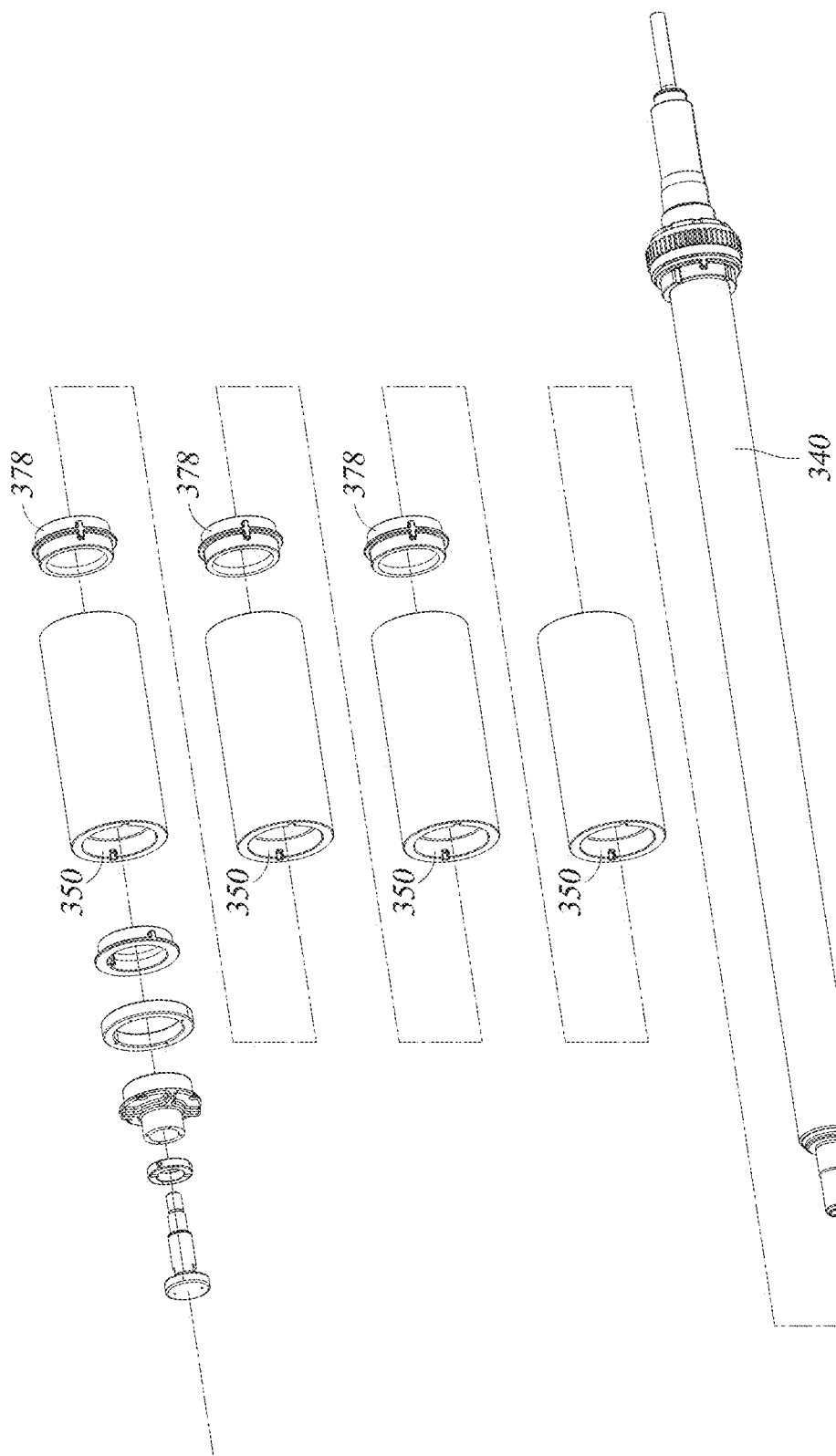
FIG. 22 is a fully exploded of the cutting roller assembly of FIG. 19.

With reference to FIG. 22, with the aperture 104 opened, all of the sleeves 350 can be removed from the driveshaft 340 for replacement. Similarly to the intermediate torque transfer members 220 described above, the assembly 300 can include intermediate torque transfer members 378.

Figure 23A:
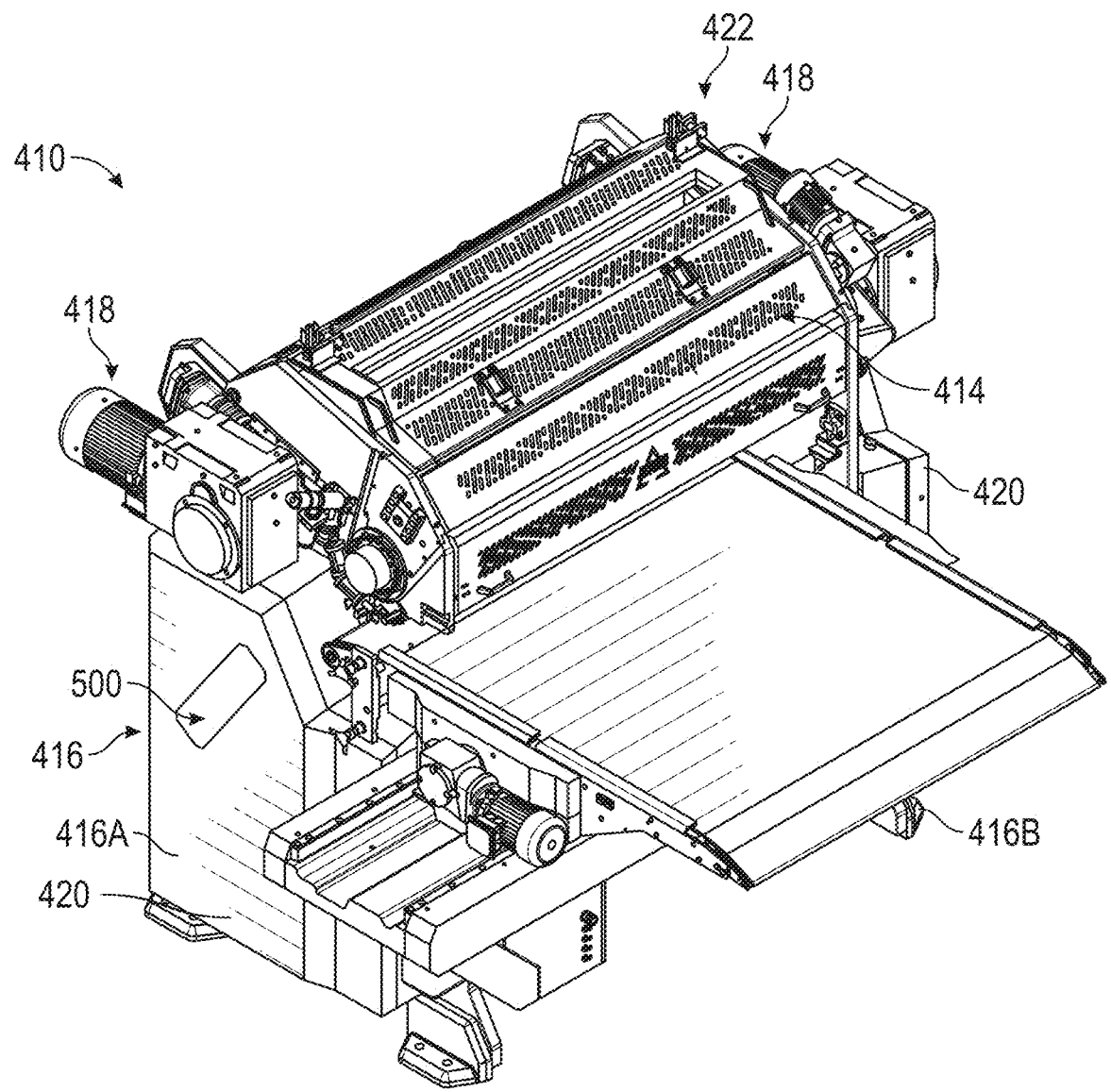
FIG. 23A is a top, front, and right-side perspective view of a sheeter with an improved cutting roller assembly.

FIG. 23A illustrates another embodiment of a sheeter 410. The sheeter 410 may include a cutting roller assembly 500 with removable cutting sleeve. The sheeter 410 is in the configuration for tortilla production, and can include various types of electronic thickness control, pinch point gap control, and other related systems and functionality. The sheeter 410 resembles or is identical to the sheeter 10 discussed above in many respects and can include any of the features described above. Accordingly, numerals used to identify features of the sheeter 10 are incremented by a factor of four hundred (400) to identify like features of the sheeter 410.

Figure 23B:
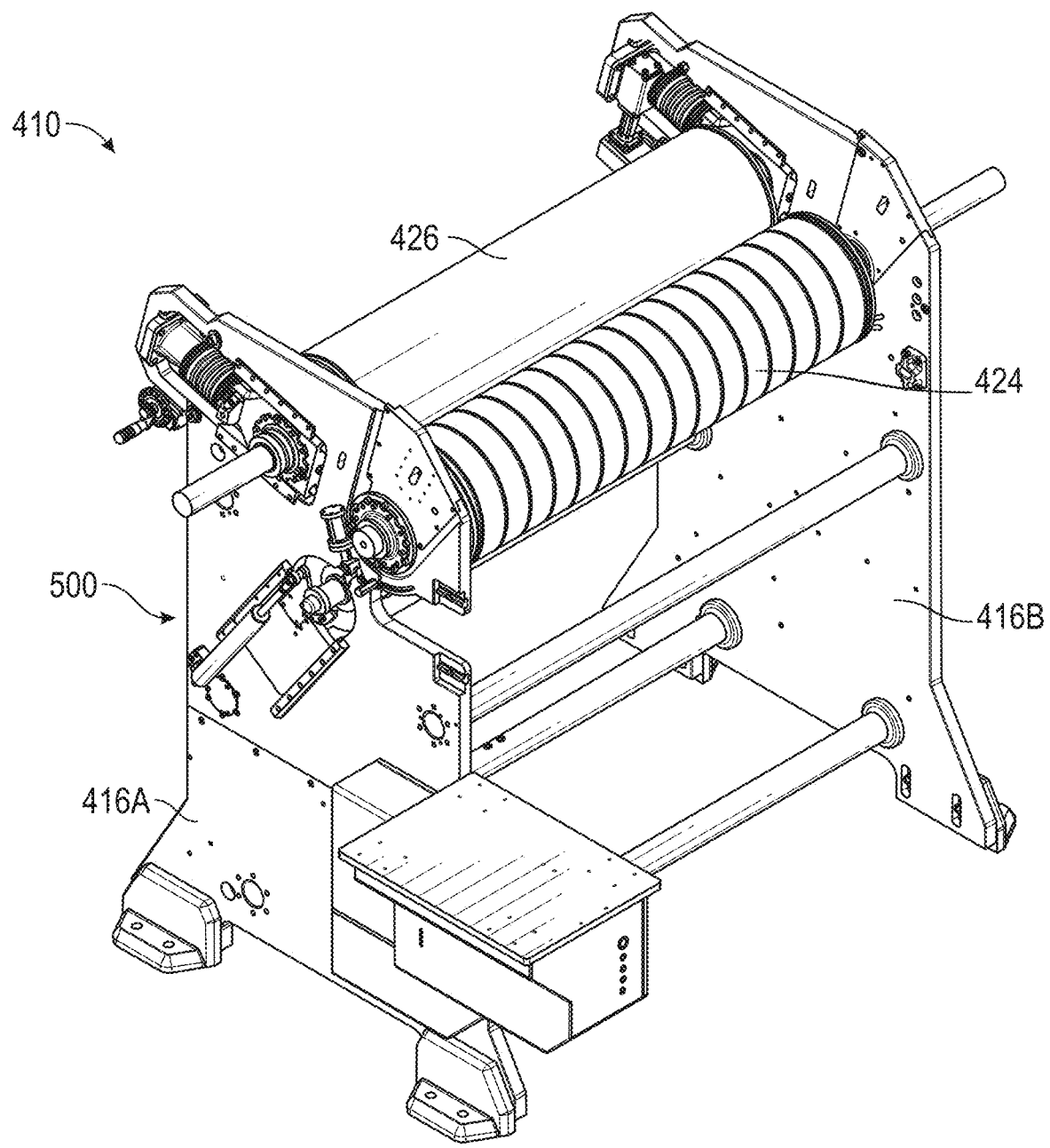
FIG. 23B is a top, front, and right-side perspective view of the sheeter of FIG. 23A with portions of the frame cover removed.
Figure 23C:
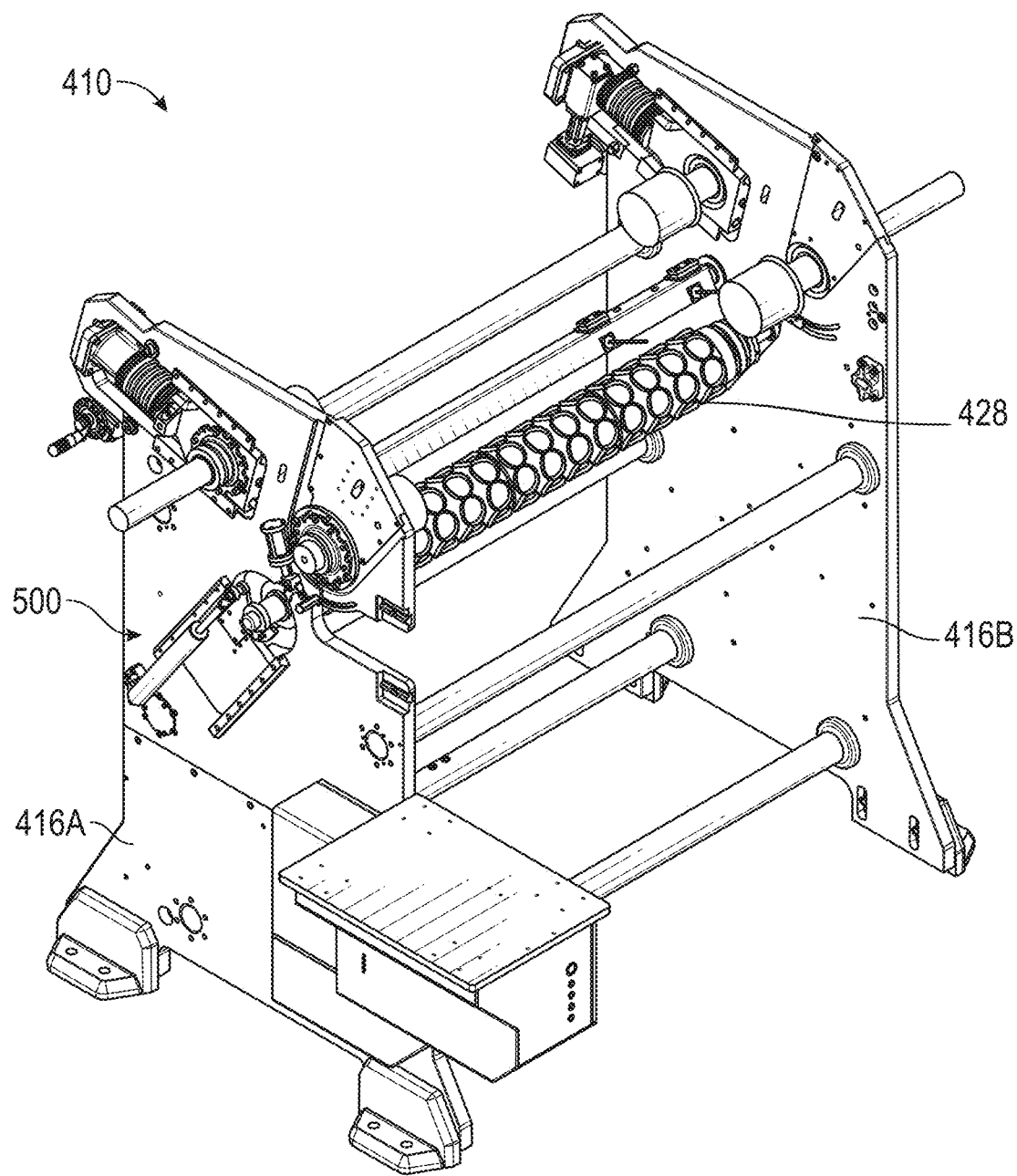
FIG. 23C is a top, front, and right-side perspective view of the sheeter of FIG. 23A with portions of the frame cover removed and the front and rear rollers removed.
Figure 24:
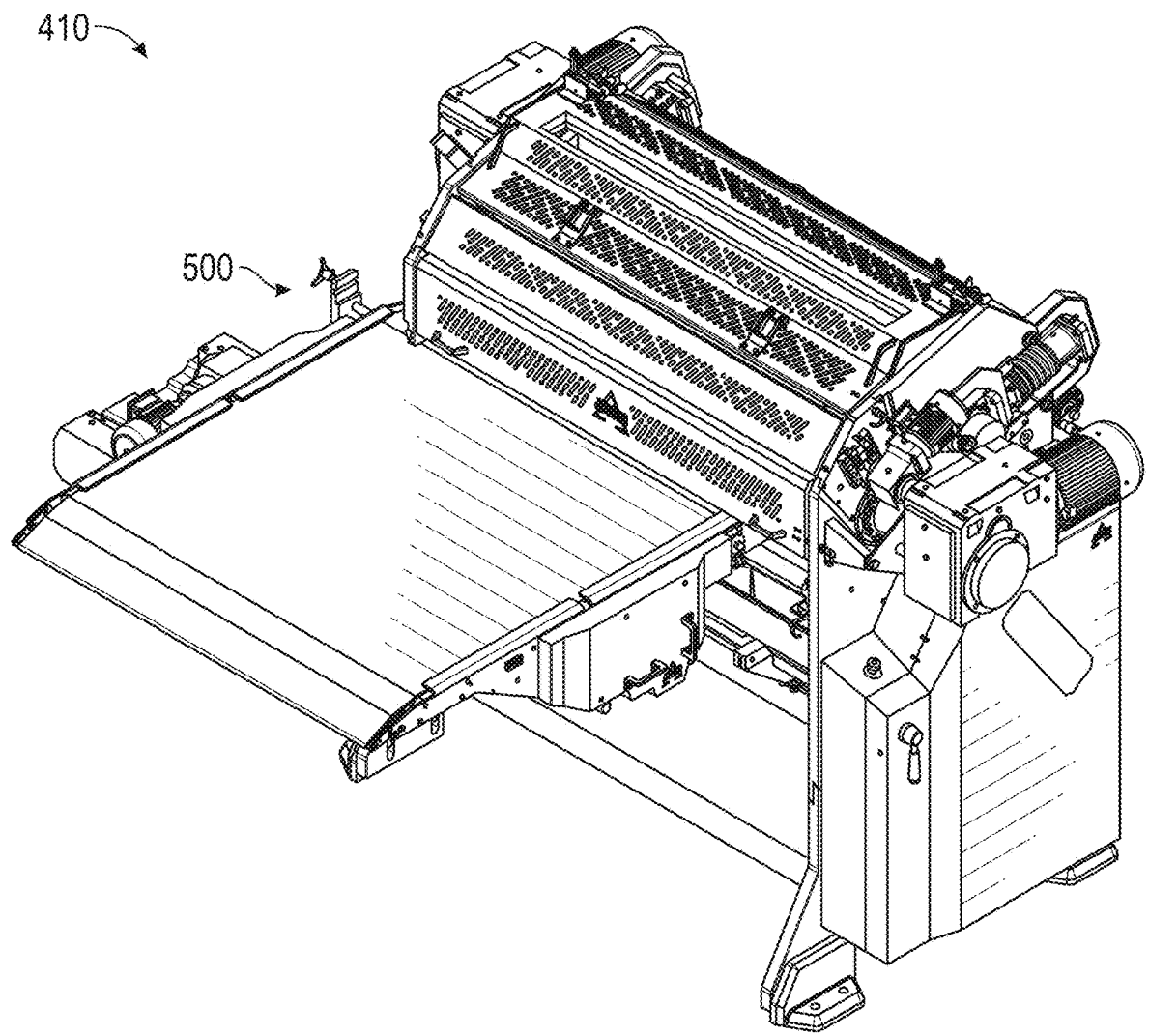
FIG. 24 is a top, front, and left-side perspective view of the sheeter of FIG. 23A.
Figure 25:
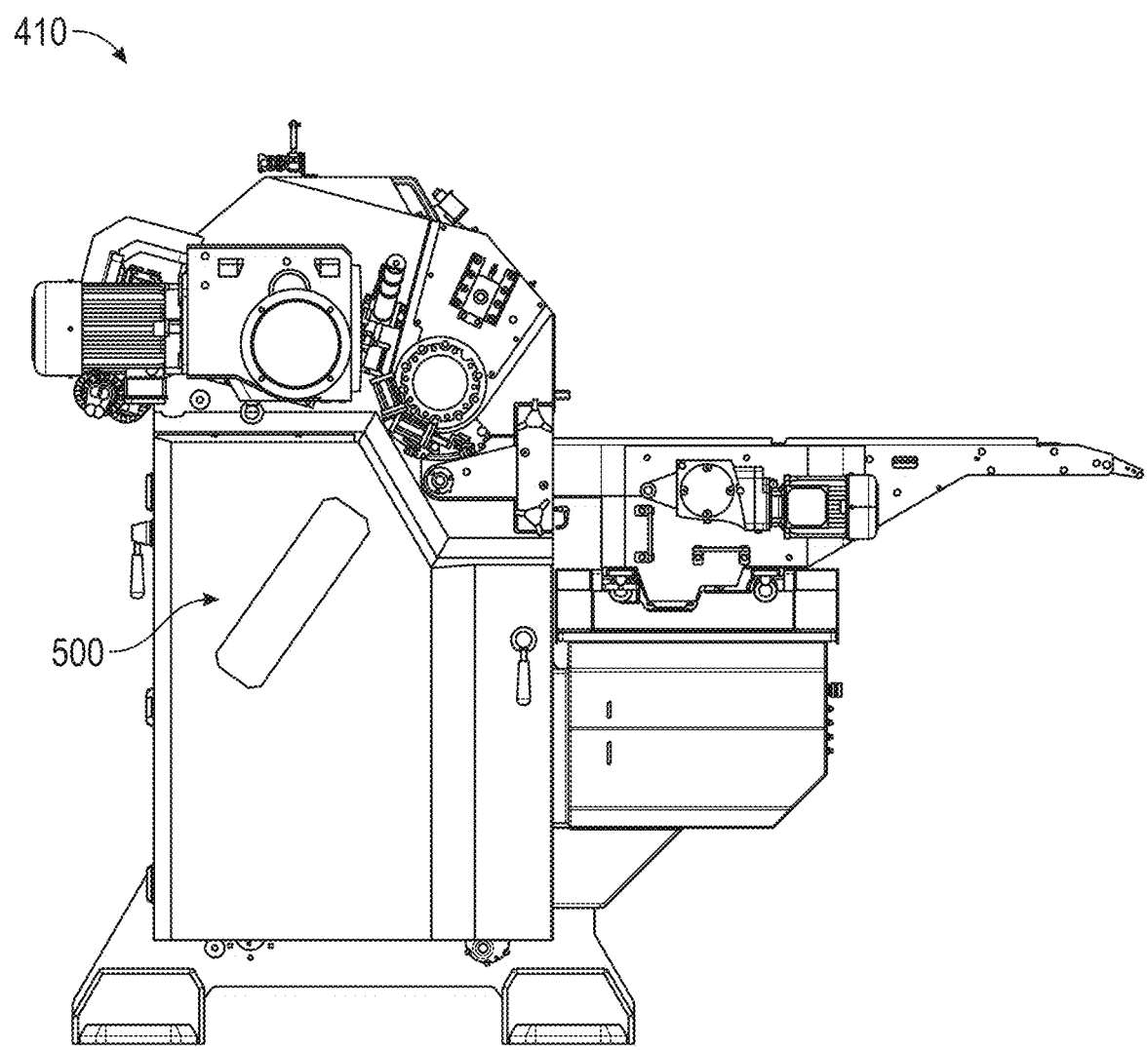
FIG. 25 is a left-side elevational view of the sheeter of FIG. 23A.

FIG. 23B illustrates the sheeter 410 with some of the coverings removed to illustrate some of the internal components of the sheeter 410. The coverings may provide some protection to the internal components to, for example, prevent any food production material from compromising any mechanical components and to prevent mold from growing inside the sheeter 410. FIG. 23C illustrates the sheeter 410 with some of the coverings removed and the front roller 424 and the rear roller 426 removed. FIG. 24 illustrates a top, front, and left-side perspective view of the sheeter 410. FIG. 25 illustrates a left-side elevational view of the sheeter 410.

Figure 26:
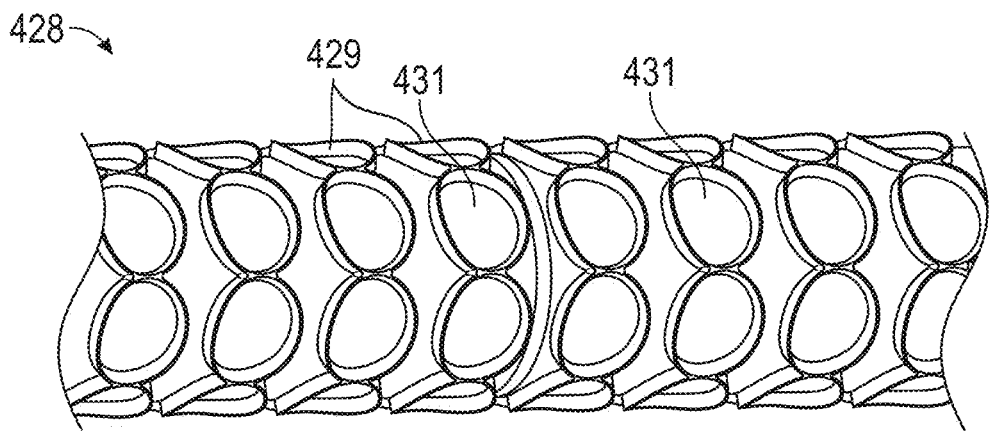
FIG. 26 is a cutting roller that can be incorporated into the sheeter of FIG. 23A.

With continued reference to FIGS. 23A-25, the sheeter 410 includes a roller assembly 414 and a support frame assembly 416. The support frame assembly 416 is in the form of a housing which can include and support various types of devices for operations of the sheeter 410. In the present embodiment, the support frame assembly 416 includes a right-side plate member 416A and a left-side plate member 416B. As shown in FIGS. 23A, and 25-26, the support frame assembly 416 can include one or more cover portions 420. The roller drive assembly 414 can include one or more electric motors 418 and an appropriate gear reduction mechanism for driving a shaft of one or more of the rollers described further herein (e.g., front roller 424, rear roller 426, cutting roller 428, and/or the like). The roller assembly 414 is attached to the support frame assembly 416. Additionally, a hopper assembly 422 is supported above the rollers of the roller assembly 414.

Figure 27:
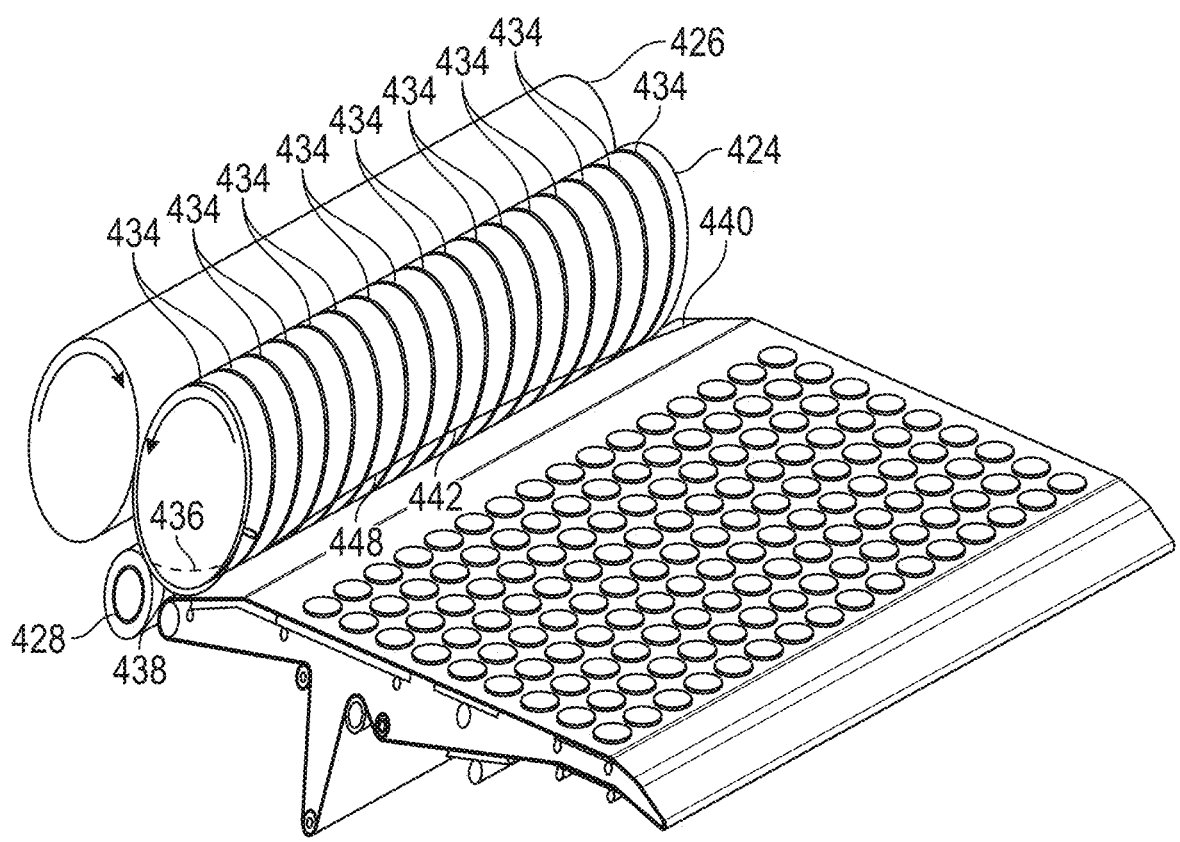
FIG. 27 is a schematic representation of a front, rear, and cutter roller within the sheeter of FIG. 23A.
Figure 28:
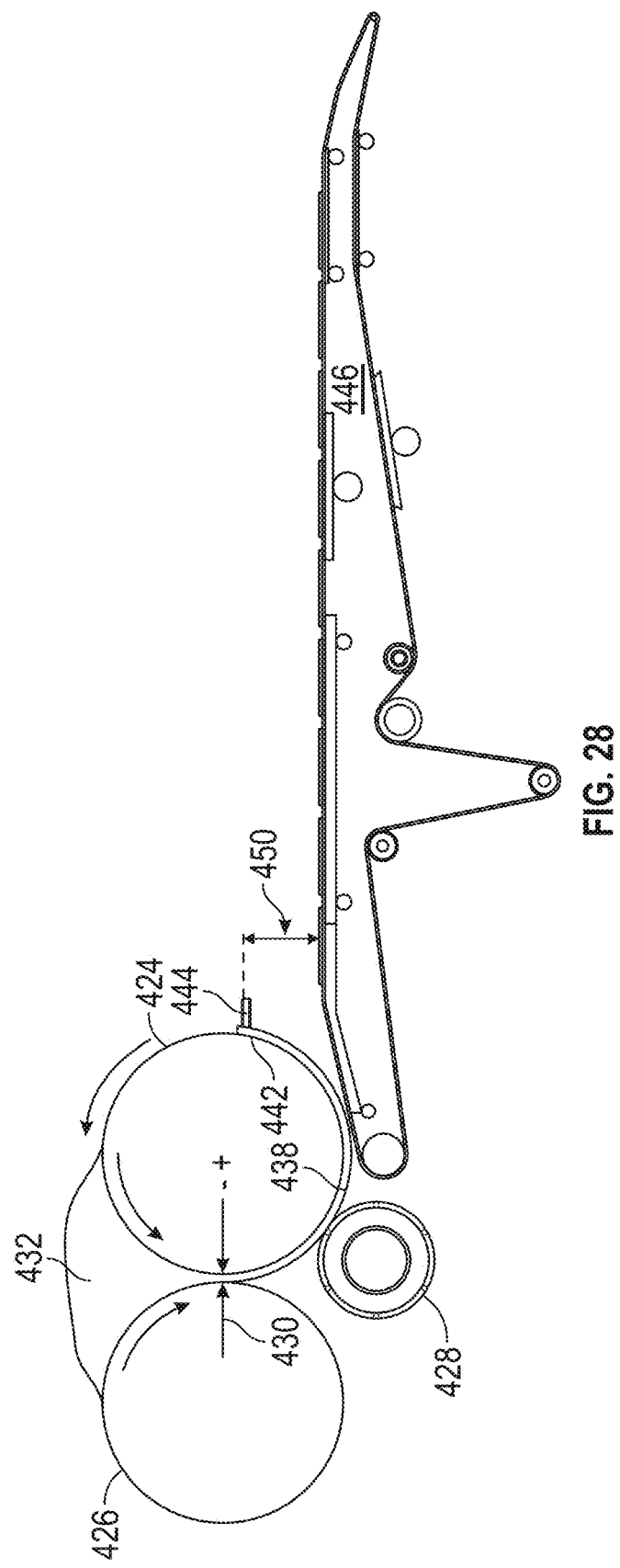
FIG. 28 is a schematic side elevational view of the roller arrangement of FIG. 27 illustrating an operation of a stripper wire illustrated in FIG. 27.

FIG. 27 illustrates a schematic representation of the roller assembly 414 of the sheeter 410. FIG. 28 illustrates a schematic side elevational view of the roller assembly 414 of FIG. 27, illustrating an operation of a stripper wire 436 illustrated in FIG. 27. As shown in FIGS. 27 and 28, the roller drive assembly 414 includes a front roller (also referred to herein as an "exit roller") 424 and a rear roller 426. Both the front roller 424 and the rear roller 426 may be generally cylindrical. The rollers 424, 426 may have a slightly roughened surface (obtained, for example, with sandblasting), which may provide benefits to the production of various food products, such as, for example, tortillas. The rollers 424, 426 are rotated in opposite directions and can be driven at the same speed or slightly different speeds, depending on desired performance characteristics. The rollers 424, 426 may be positioned generally parallel to each other. For example, the central axis of the front roller 424 may be vertically aligned with the central axis of the rear roller 426. Generally, both the front roller 424 and the back roller 426 may have approximately the same diameter. However, in some embodiments, the diameters of the front and rear rollers 424, 426 may differ and the central axes of the rollers 424, 426 may be offset as a result.

FIG. 26 illustrates an embodiment of a cutting roller 428 that can be incorporated into the sheeter 410. The cutting roller 428 may be part of the cutting roller assembly 500. The cutting roller 428 may comprise a shaft (e.g., driveshaft 540 described with reference to at least FIG. 31) and one or more removable cutting sleeves (e.g., sleeve(s) 550), described in greater detail below with reference to FIGS. 29-44. In the embodiment illustrated in FIG. 26, the cutting roller 428 is in the form of a cutting roller designed for tortilla manufacturing, and thus includes a plurality of circular-shaped raised edges 429 and recesses 431 (also referred to as "cutting guides") for cutting circular pieces of dough. It is recognized that the cutting roller 428 may include cutting guides in any shape to produce a desired shape of a food product. For example, a cutting roller designed for tortilla chip manufacturing may include a plurality of triangular-shaped raised edges (e.g., the cutting roller 128 of FIG. 4). In another example, the cutting roller 428 may include square, circle, oval, diamond, rectangle, triangle, and/or the like cutting guides. In some embodiments, including the embodiments illustrated, the cutting roller 428 includes the same shaped cutting guides extending along the entire length of the cutting roller 428. In some embodiments, cutting roller 428 may comprise one or more different cutting guide shapes extending along its length. For example, a first segment of the cutting roller 428 may comprise a first shaped cutting guide (e.g., triangular), and a second segment of the cutting roller 428 may comprise a second shaped cutting guide (e.g., circular). In operation, the cutting roller 428 is also mounted within the roller assembly 414.

With continued reference to FIGS. 27 and 28, the rollers 424, 426 are mounted parallel to each other with a gap between them, such that the roller 424 does not directly contact the roller 426. The gap may defined as a pinch point gap 430. The hopper assembly 422 (e.g., as shown in FIG. 1) is mounted above the rollers 424, 426 so as to support dough, such as masa 432, above the pinch point gap 430. As such, as the rollers 424, 426 are driven in counter-rotating directions, the masa 432 is pulled into the pinch point gap 430. As a result of this interaction, a thin layer of dough 432 is discharged from the pinch point gap 430 and adhered to an outer surface of the exit roller 424. As the sheet of dough 432 moves counter-clockwise along with the exit roller 424 (as viewed in FIG. 27), the sheet of dough 432 is passed between the cutting roller 428 and the outer surface of the exit roller 424. The cutting roller 428 cuts the dough sheet 432 into desired shapes. In the embodiment illustrated in FIGS. 26-28, the dough sheet 432 is cut into circular shaped pieces of dough, which may be used for, for example, making tortillas. As described above, other types of cutting rollers and cutting guides can also be used.

The exit roller 424 may also include a plurality of grooves, in which bands 434 are disposed. For example, the exit roller 424 may include 2, 4, 6, 8, 10, 20, 50, 100, and/or the like grooves and bands. The grooves have an inner surface that has a smaller diameter than the inner surface of the bands 434. The bands are sufficiently large such that they can be pulled approximately parallel or slightly projecting from the outer surface of the roller 424.

The sheeter 410 may include a stripper wire 436 that is secured to the roller assembly 414 at locations adjacent to both ends of the front roller 424 and downstream from the cutting roller 428. More specifically, the stripper wire 436 is mounted at the right end of the front roller 424 adjacent to the right-most point of contact 438 and secured at the left end of the roller 424 adjacent to the left-most point of contact 440. The stripper wire is threaded under the bands 434. As such, the stripper wire can strip off cut pieces of dough from the outer surface of the front roller 424, yet allow remaining pieces of dough, referred to as "rework", to remain in contact with the bands 434 and be fed back into the hopper so as to become reworked with the dough 432 above the pinch point gap (FIG. 28). As shown in FIG. 5, the stripper wire 436 may cause shaped pieces of dough to fall from the front roller 424.

With reference to FIG. 27, during operation, the rotation of the roller 424 (e.g., counter-clockwise in FIGS. 27 and 28) and the resulting friction between the stripper wire 436 and the outer surface of the roller 424 and the bands 434 (which rotate with the roller 424) causes the stripper wire 436 to be pulled in the counterclockwise direction. As such, the stripper wire tends to follow an arched shape around the front roller 424. For example, as shown in FIG. 27, the right-most point of contact 438 of the stripper wire 436 and the outer surface of the front roller 424 is close to the cutting roller 428. However, towards the center of the front roller 424, the stripper wire 436 is pulled up to an apex 442 which is at the highest point of contact 442 between the stripper wire 436 and the outer surface of the roller 424. The stripper wire 436 can break, which requires a user to access the space at the discharge side of the front roller 424 and the stripper wire mount points for appropriate repairs.

With continued reference to FIGS. 27 and 28, the difference in height between the right-most contact point 438 and the apex 442 causes individually cut pieces of dough 444 to be separated and fall away from the outer surface of the front roller 424 at different heights. For example, circular pieces of dough discharge from the front roller 424 near the contact point 438 are dropped immediately down onto an output conveyor assembly 446. At an intermediate contact point 448 between the contact points 438 and 442, the cut pieces of dough fall a distance 450 from the outer surface of the front roller 424 to the output conveyor 446. Further, at or near the contact point 442, the cut pieces of dough fall a greater distance, which may be much greater than the distance 450, onto the output conveyor 446. The higher the contact point 442, the larger the distance the cut dough falls.

Figure 29:
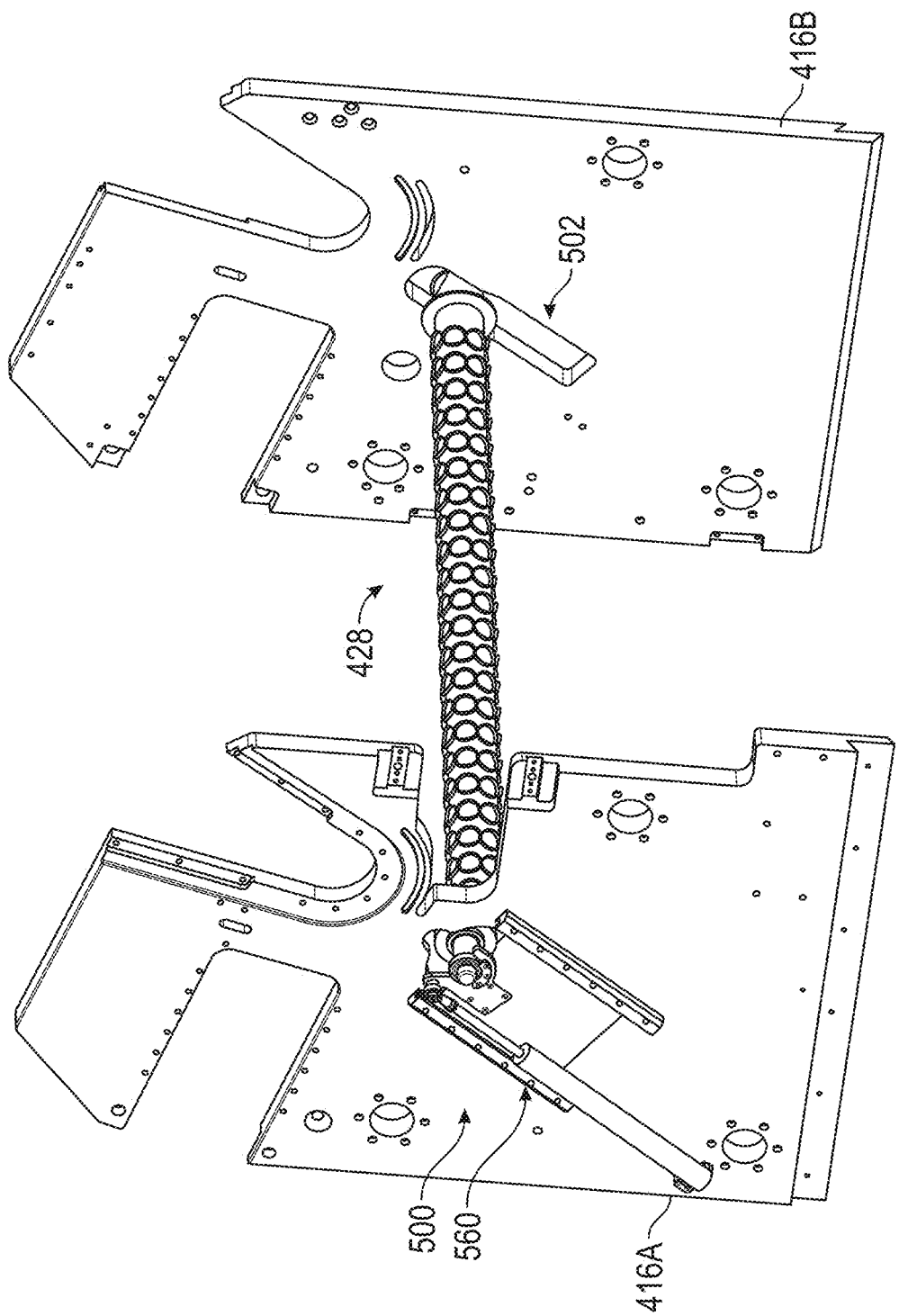
FIG. 29 is a top, front, and right-side perspective view of the sheeter of FIG. 23A, with the cover portions removed.
Figure 30:
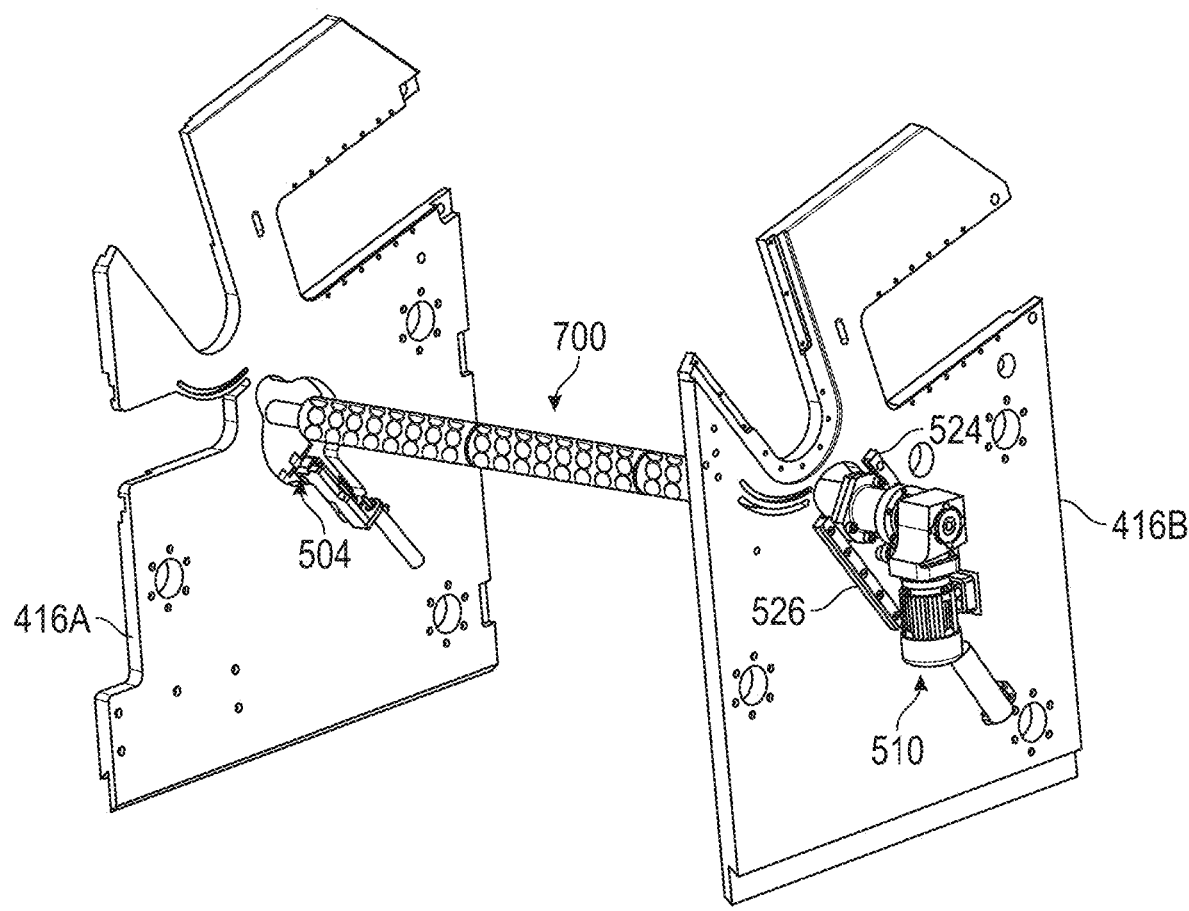
FIG. 30 is a top, front, and left-side perspective view of the sheeter of FIG. 23A, with the cover portions removed.

FIG. 29 illustrates a top, front, and right-side perspective view of the sheeter 410, with the cover portions 420 removed. FIG. 30 illustrates a top, front, and left-side perspective view of the sheeter 410, with the cover portions 420 removed. As shown in FIGS. 29 and 30, the cutting roller assembly 500 is supported by the right and left side plate members 416A, 416B. The right and left side plate members 416A, 416B may comprise any suitable material to support the cutting roller assembly 500 and the other components of the sheeter 410. As described with reference to FIG. 23A, the right and left side plate members 416A, 416B may generally be covered in operation. The left-side plate member 416B includes a slot 502 that is sized to allow for adjustment of the position of the cutting roller assembly 500. For example, the slot 502 may comprise an elongated approximately rectangular slot such that a left side of the cutting roller assembly 500 can be moved vertically along the left side plate members 416B. The right-side plate member 416A includes an access aperture 504 that is sized to coincide with the slot 502 but also to be large enough for the entire cutting roller assembly 500 to pass therethrough. The cutting roller assembly 500 includes a drive assembly 510 and an access assembly 560. For example, the drive assembly 510 may be positioned on the left side of the cutting roller assembly 500 and outside of the left-side plate member 416B and the access assembly 560 may be positioned on the right side of the cutting roller assembly 500 and outside the right-side plate member 416A, or vice-versa. As shown in at least FIG. 23A, both the drive assembly 510 and the access assembly 560 may be covered in operation by the one or more cover portions 420.

Figure 31:
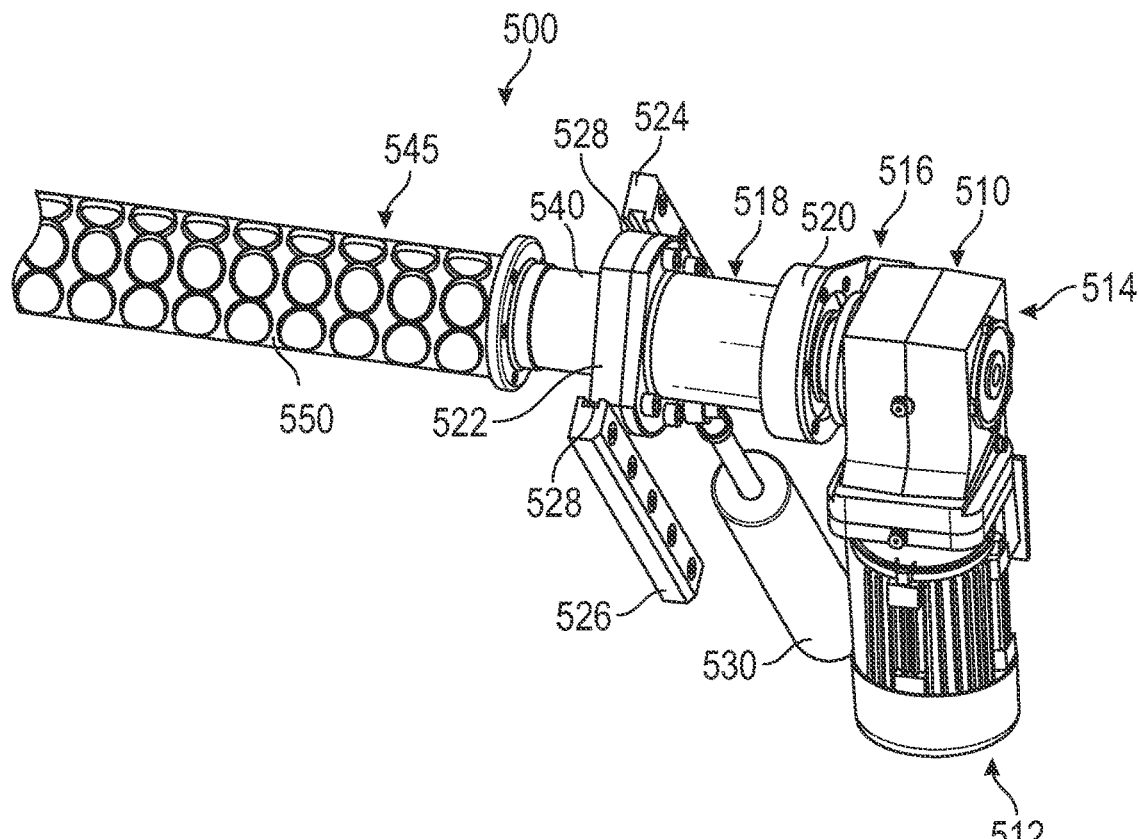
FIG. 31 is an enlarged perspective view of a drive and bearing support assembly of the cutting roller assembly, with the left-side plate of the frame removed.

FIG. 31 illustrates an embodiment of the drive assembly 510 of the cutting roller assembly 500. The drive assembly 510 can include a drive motor 512 and a gear unit 514. The gear unit 514 may include a right-angle arrangement of gears as well as a gear ratio reduction. Additionally, the drive assembly 510 can include an anti-rotation mount point 516 for preventing the rotation of the motor 512 and the gear unit 514 relative to the support frame assembly.

With continued reference to FIG. 31, the drive assembly 510 also includes a bearing assembly 518 that can include a bearing offset housing 520, inside of which are a plurality of bearing sets. The bearing assembly 518 can be configured with sufficient strength to support the drive assembly 510 in a cantilevered manner. Any appropriate arrangement of bearings can be used.

The bearing offset housing 520 can be mounted to a guide plate 522. The guide plate 522 can be slidingly engaged with a pair of guide rails 524, 526 that can be secured to the left-side plate 416B (e.g., as shown in FIG. 30) of the support frame assembly 416. For example, the guide rails 524, 526 can each include a guide groove 528 and the guide plate 522 can be sized to fit within the grooves 528, so as to be moveable along the longitudinal length of the grooves 528. An adjustment actuator 530 can be connected at a first end to the guide plate 522 and at a second end to the left-side plate 416B. The adjustment actuator 530 may be configured to move the guide plate 522 and the connected drive assembly 510 upward and downward for achieving different spacings between the cutting roller assembly 500 and the exit roller 424. For example, when the guide plate 522 is moved upward, the spacing between the cutting roller assembly 500 and the front roller 424 may be reduced, and when the guide plate 522 is moved downward, the spacing between the cutting roller assembly 500 and the front roller 424 may be increased. The actuator 530 can be any type of actuator, including, but without limitation, a jackscrew actuator. Additionally, the actuator 530 can be aligned to move the guide plate 522 so as to adjust the position of the cutting roller assembly 500 along the slot 502 (e.g., as described above and shown in FIG. 29).

As shown in FIG. 31, the cutting roller assembly 500 can include a driveshaft 540 and a removable cutting sleeve assembly 545. The driveshaft 540 can extend through the bearing assembly 518 and into the drive assembly 510 such that the motor 512 can drive the driveshaft 540. As described further herein, the removable cutting sleeve assembly 545 may comprise one or more cutting sleeves 550 that are configured to be slotted overtop of the driveshaft 540. The removable cutting sleeve assembly 545 may comprise a plurality of cutting guides 555 comprising raised edges. Like the circular-shaped raised edges 429 of FIG. 26, the cutting guides 555 extend radially outwards from the removable cutting sleeve assembly 545 and are configured to cut food product in the shape of the cutting guides 555 in operation. As described above, the cutting guides 555 may comprise square, circle, oval, diamond, rectangle, triangle, and/or the like projections.

Having a cutting roller assembly 500 with a removable cutting sleeve assembly 545 can provide many advantages over current sheeter systems. For example, in current systems, the cutting portion of the cutting roller wears overtime and may need to be replaced one or more times a year. Additionally, in current systems, the cutting roller needs to be changed every time the operator wants to cut a different shaped food product (e.g., circular tortillas vs triangular tortilla chips). As described above, current cutting rollers are extremely heavy and difficult to remove and replace for either wear or to produce a different product. Conversely, in the embodiments described herein, the drive-shaft (e.g., the drive-shaft 540) can be a semi-permanent/permanent component of the sheeter (e.g., the sheeter 410). As a result, when the cutting guides (e.g., the cutting guides 555) wear or need to be replaced, only the removable cutting sleeve assembly (e.g., the sleeve 550) needs to be changed. This feature allows an individual user to change the cutting sleeve assembly without the need for special machinery or additional people to carry the cutting roller. As a result, an operator can change the cutting sleeves as many times per day as required. Additionally, because the drive-shaft does not need to be removed, a larger and/or heavier drive-shaft can be used. Having a larger/heavier drive-shaft may provide advantages such as, for example, less bowing and more even pressure distribution along the dough.

Figure 32:
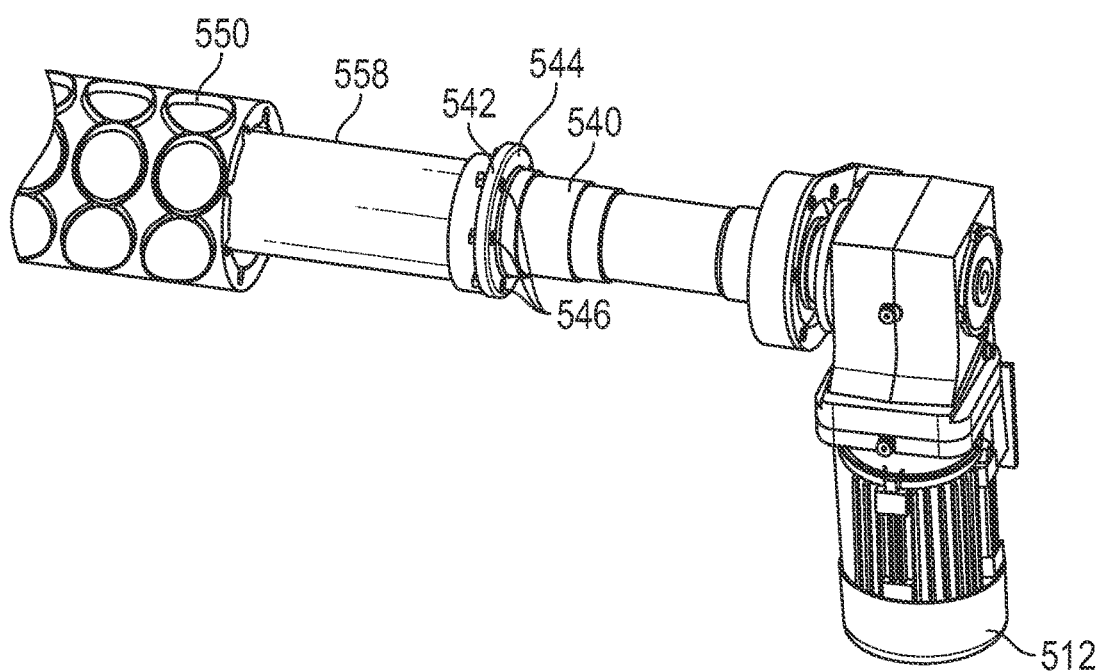
FIG. 32 is another enlarged view of the cutting roller assembly of FIG. 31, with the bearing support assembly removed.
Figure 33:
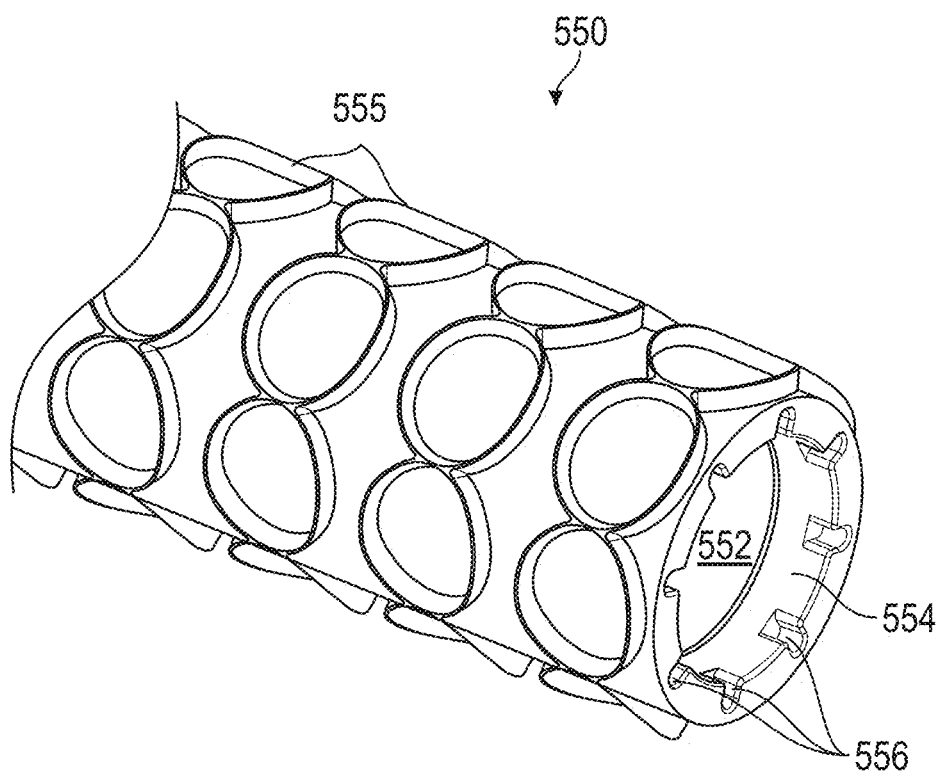
FIG. 33 is perspective view of one end of a removable cutting sleeve.
Figure 34:
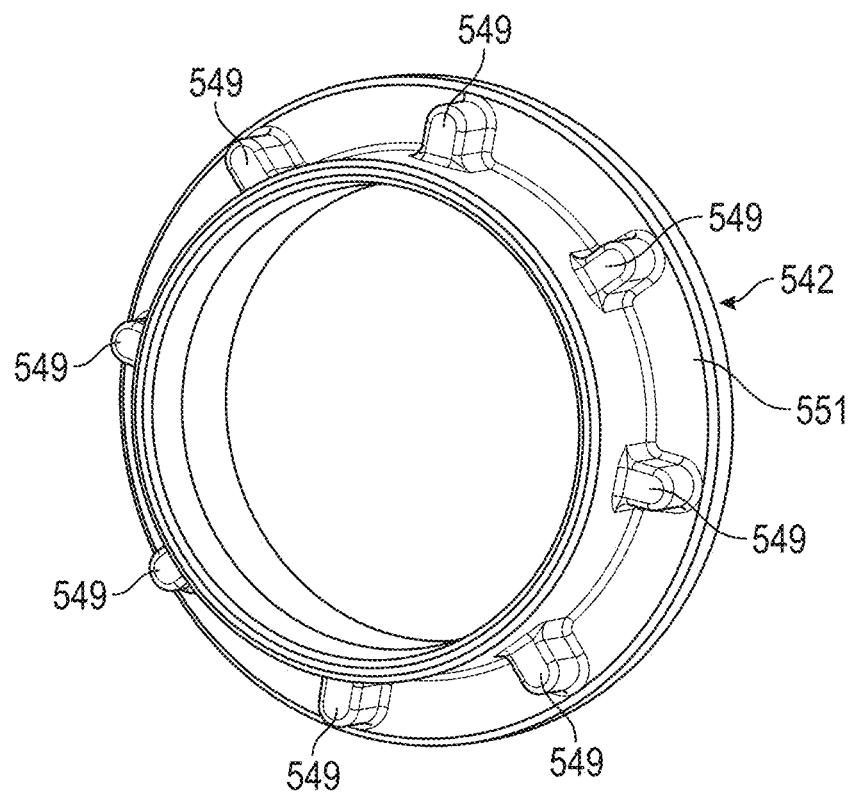
FIG. 34 is a perspective view of a right-side of a torque transfer ring in the assembly of FIG. 32.
Figure 35:
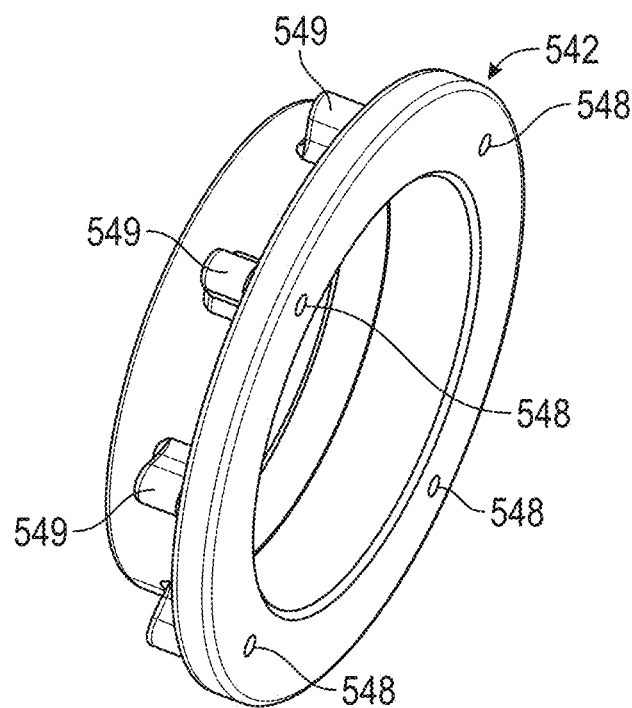
FIG. 35 is a perspective view of a left-side of a torque transfer ring in the assembly of FIG. 34.

FIG. 32 illustrates another enlarged view of the cutting roller assembly 500 with the bearing support assembly 518 removed. FIG. 33 illustrates a perspective view of one end of a removable cutting sleeve 550. FIG. 34 illustrates a perspective view of a right-side of a torque transfer member 542 and FIG. 35 illustrates a perspective view of a left-side of the torque transfer member 542. With reference to FIGS. 32-35, optionally, the driveshaft 540 can transfer torque from the motor 512 to the cutting sleeve assembly 545 through a torque transfer member 542. For example, but without limitation, the torque transfer member 542 can include at least one transfer engagement member 549 and the cutting sleeve assembly 545 can include one or more sleeve engagement members 556. Generally, the number of transfer engagement members 549 correspond to the number of sleeve engagement members 556. For example, the torque transfer member 542 and sleeve 550 can include 1, 2, 3, 4, 5, 10, 15, 20, 50, and/or the like transfer engagement members 549 and sleeve engagement members 556 respectively. The transfer engagement members 549 are configured engage with the sleeve engagement members 556 so that the sleeve 550 and the torque transfer member 542 are rotationally coupled together and thus torque can be transmitted from the torque transfer member 542 into the sleeve 550. In one example, including the illustrated embodiment, the transfer engagement members 549 comprise a plurality of protrusions extending radially from a collar 151, and the sleeve engagement members 556 comprise a plurality of recesses configured to receive the protrusions. In some embodiments, the arrangement may be switched, such that the transfer engagement members 549 comprise a plurality of recesses and the sleeve engagement members 556 comprises a plurality of projections. Other arrangements are also possible.

With reference to FIG. 32, in one example, but without limitation, the driveshaft 540 can include a drive flange 544 fixed to the driveshaft 540. A plurality of fasteners 546 can be used to secure the drive flange 544 to the torque transfer member 542, for example, with threaded fasteners extending through holes 548 (e.g., as shown in FIG. 35).

With reference to FIG. 33, in some embodiments, including the embodiment illustrated, the cutting sleeve 550 includes a central/inner bore 552 and an increased inner diameter portion 554 that has a larger diameter than the inner bore 552. Additionally, as described above, the sleeve 550 can include a plurality of sleeve engagement members 556 that are configured to receive the transfer engagement members 549. The inner surface of the enlarged diameter portion 554 can be sized to receive the outer surface of the collar 551. Thus, when engaged together, the transfer engagement members 549 and the sleeve engagement members 556 cooperate to transmit torque from the driveshaft 540, through the drive flange 544, to the torque transfer member 542, and into the sleeve 550. The diameter of the inner bore 552 can be sized to provide a close fit with the outer surface 558 of the driveshaft 540 and to allow for a relative sliding therebetween. For example, inner bore diameter 552 may be slightly larger than the diameter of the outer surface 558 to allow for sleeves 550 to be easily replaced within the cutting roller assembly 500.

Figure 36:
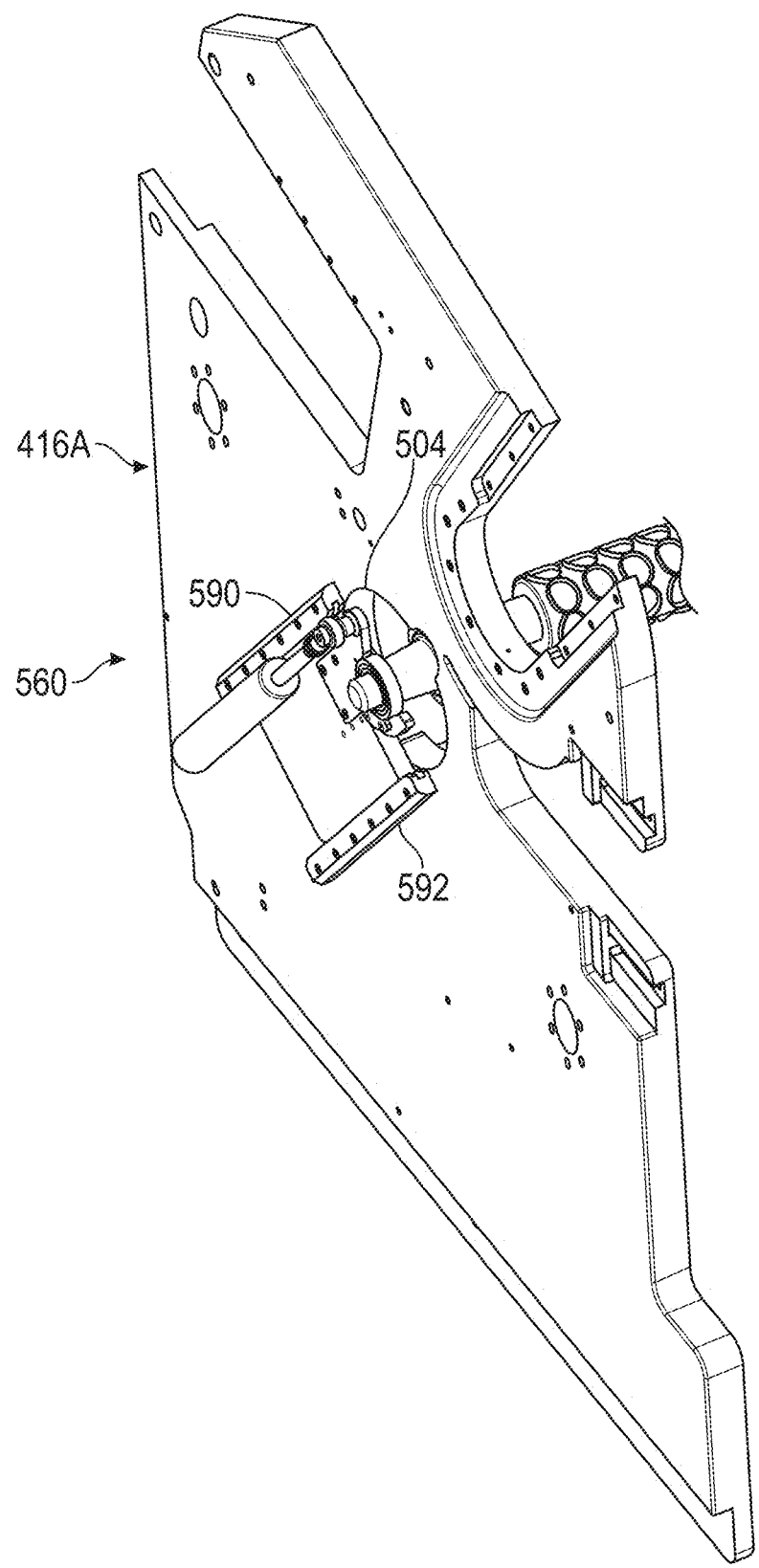
FIG. 36 is a perspective view of the right side plate member.
Figure 37:
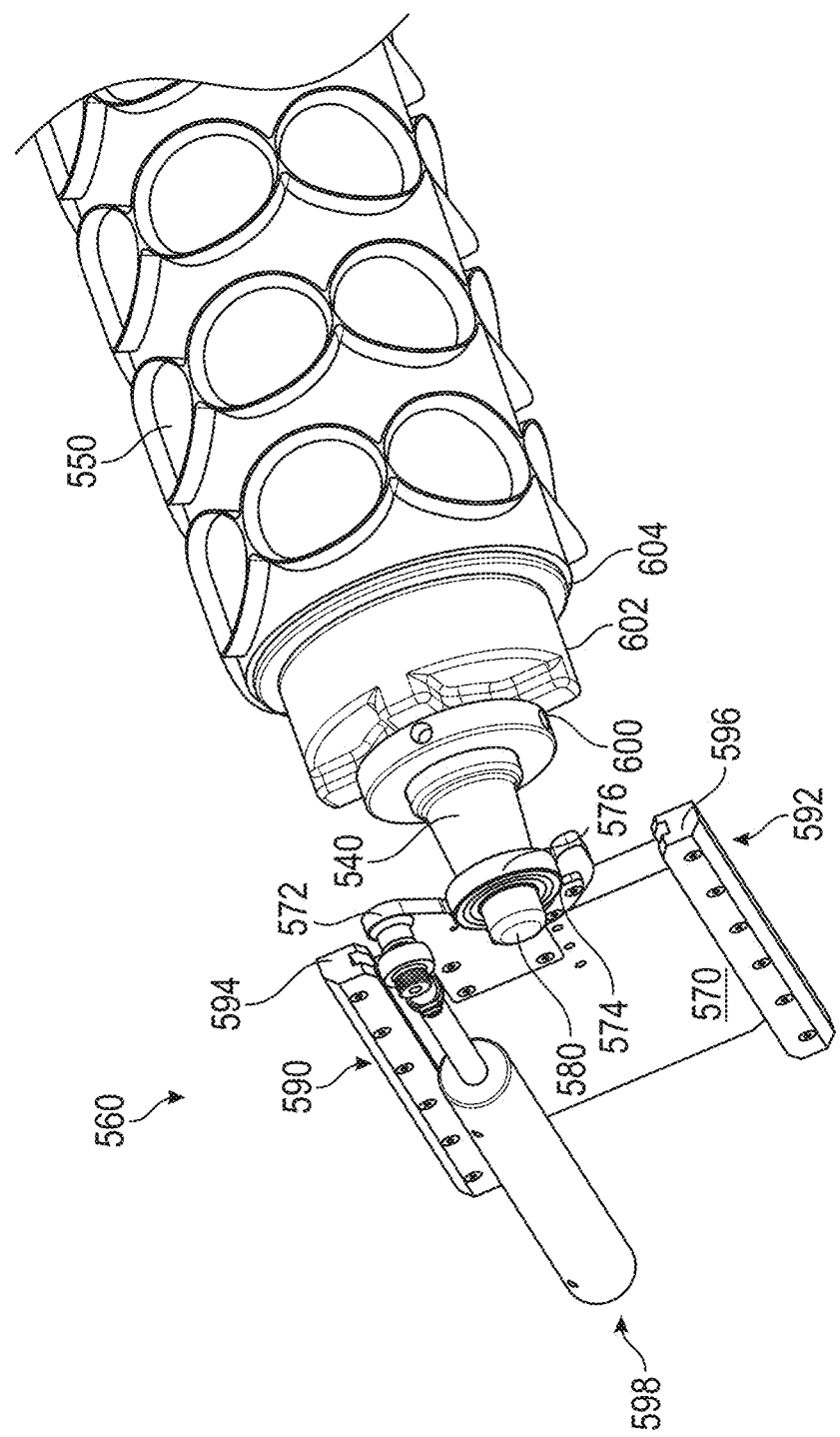
FIG. 37 is an enlarged perspective view of the access assembly with the right-side plate member of the frame removed.

FIG. 36 illustrates a perspective view of the right-side plate member 416A. The right-side plate member 416A includes an access assembly 560. FIG. 37 illustrates an enlarged perspective view of the access assembly 560 with the right-side plate member 416A removed. Generally, the access assembly 560 is configured to allow a user/operator to access the aperture 504. The access assembly 560 acts as an access door for the aperture 504. For example, the access assembly 560 is configured to move between an open position, where the aperture 504 is exposed, and a closed position, where the aperture 504 is covered. The open position allows the operator to access the cutting roller assembly 500 and easily remove sleeve(s) 550 as required. The closed position may be used for operation of the sheeter 410. In some embodiments, the access assembly 560 includes an access door member and a removeable mandrel member, like the access assembly 160 described with reference to at least FIGS. 14 and 15. In other embodiments, including the embodiment illustrates in at least FIGS. 36 and 37, the access assembly 560 comprises a guide plate portion 570 and a bearing mount portion 572. The bearing mount portion 572 may be removably coupled to the guide plate 570 and the bearing mount portion 572 can include a bearing recess 574 that is configured to supporting a bearing 576 therein. For example, the driveshaft 540 of the cutting roller assembly 500 may include one or more retained bearing 576 and the bearing recess 574 may be configured to receive and interface with the bearing 576. To retain the bearing on the driveshaft 540, the terminal end 580 of the driveshaft 540 may be larger than an inner diameter of the bearing 576. For example, the terminal end 580 of the driveshaft 540 is supported by the bearing 576 in use. The guide plate portion 570 can be supported by guide rails 590, 592 that are mounted on either side of the aperture 504 (e.g., as shown in FIG. 36). The guide rails 590, 592 can include guide grooves 594, 596, respectively, configured to slidingly receive side portions of the guide plate 570 for up and down movement.

As shown in FIG. 36, an actuator 598 can be mounted to the right-side plate 416A for moving the guide plate 570 and the bearing mount 572 upward or downward for proper alignment of the cutting roller assembly 500 during use. Additionally, the guide plate 570 can be moved downward to expose a sufficient portion of the aperture 504 to allow for removal of the sleeve 550. Depending on the arrangement, movement of the guide plate 570 via the actuator 598 may cause the bearing 576 to disengage from the bearing recess 574 of the bearing mount 572.

Figure 38:
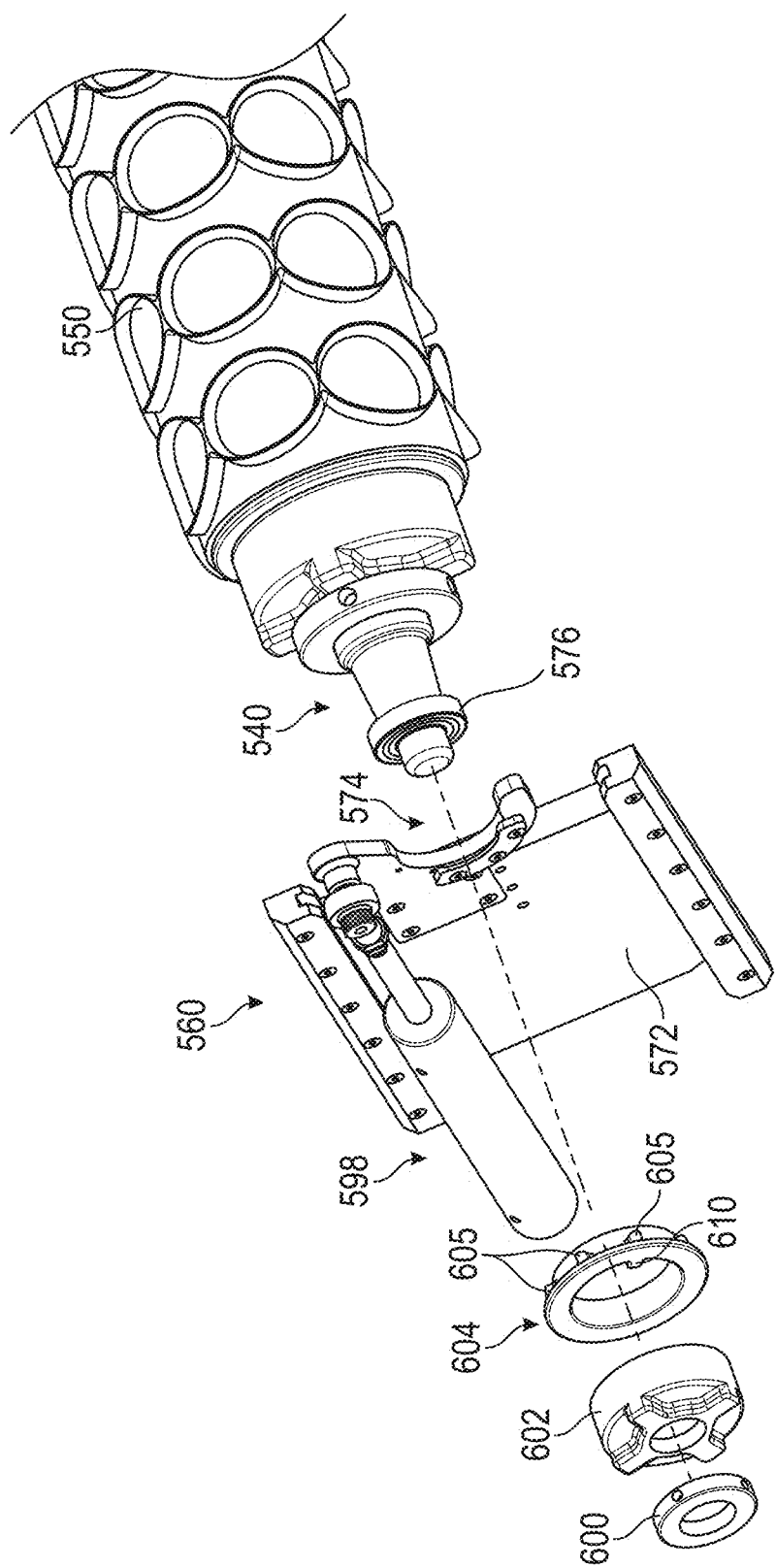
FIG. 38 is an enlarged perspective view of the access assembly, with the guide plate in a partially downward position with the access assembly partially exploded.
Figure 39:
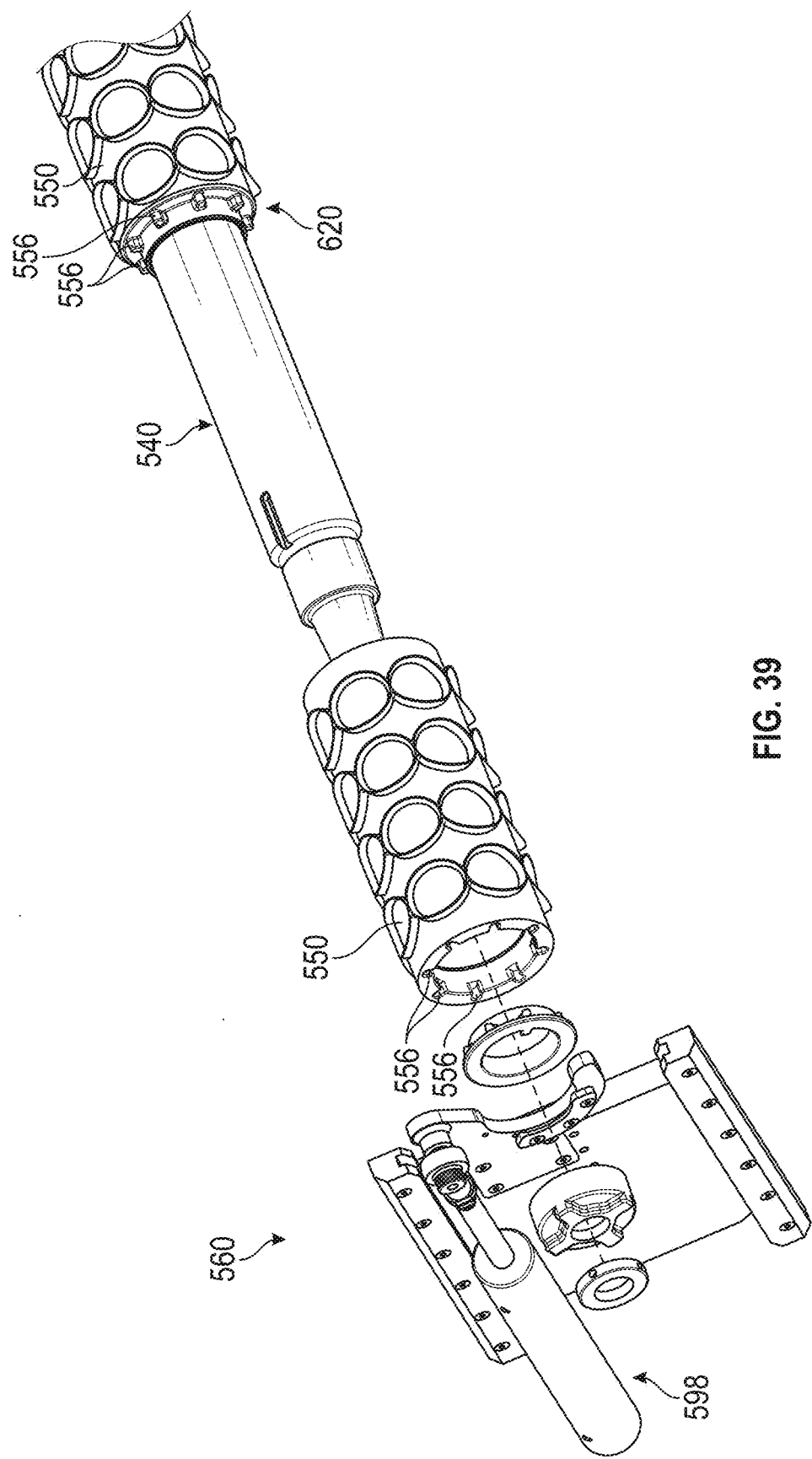
FIG. 39 is a further exploded view of the assembly of FIG. 38.

FIG. 38 illustrates an enlarged perspective view of the access assembly 560, with the guide plate 570 in a partially downward position with the access assembly 560 partially exploded. FIG. 39 illustrates a further exploded view of the access assembly 560. In the example arrangement illustrated in FIGS. 38 and 39, the guide plate 570 has moved downward exposing the aperture 504. In this arrangement, the bearing mount 572 is disengaged from the bearing 576 and as a result, the access assembly 560 is disengaged from the driveshaft 540, thereby disconnecting the guide plate 570 from the cutting roller assembly 500. As such, the actuator 598 can be actuated to pull the guide plate 570 downwardly until the aperture 504 is unobstructed to provide access to the cutting roller assembly 500 through the aperture 504. With the guide plate 570 is in a downward positioned such that the aperture 504 is in the opened position, additional parts can be removed.

For example, in the configuration described above, a locking collar 600, compression member 602, and a torque transfer member 604 can be removed from the driveshaft 540. The locking collar 600 can include one or more set screws for securement to a portion of the driveshaft 540. The compression member 602 can be configured to be compressible and thus act as a spring for providing a continuous pressing force between the locking collar and all of the components between the locking collar 600 and the drive flange 544 (e.g., as shown in FIG. 32). As such, the locking collar 600 and compression member 602 provide for transferring an axial force from the collar 600 to the torque transfer member 604 to ensure secure engagement with the sleeve 550.

The torque transfer member 604 can have similar or the same construction as the torque transfer member 542 described with reference to FIGS. 34-35. Optionally and/or additionally, the torque transfer member 604 may include an additional protrusion 610 configured to act as a "key" and the driveshaft 540 can include a keyway 612 configured to receive the key 610. As such, torque from the driveshaft 540 can pass to the torque transfer member 604.

Like the torque transfer member 542, the torque transfer member 604 may comprise a plurality of transfer engagement members 605, which may comprise protrusions configured to engage with the sleeve engagement members 556 (e.g., corresponding recess) on the sleeve 550. As such, torque from the driveshaft 540 can pass through the keyway 612 to the protrusion 610, into to the torque transfer member 604, then into the sleeve 550 by way of the engagement of the transfer engagement members 605 with the sleeve engagement members 556. With the collar 600, compression member 602, and torque transfer member 604 removed from the driveshaft 540, the one or more sleeves 550 can also be removed from the driveshaft 540.

Figure 40:
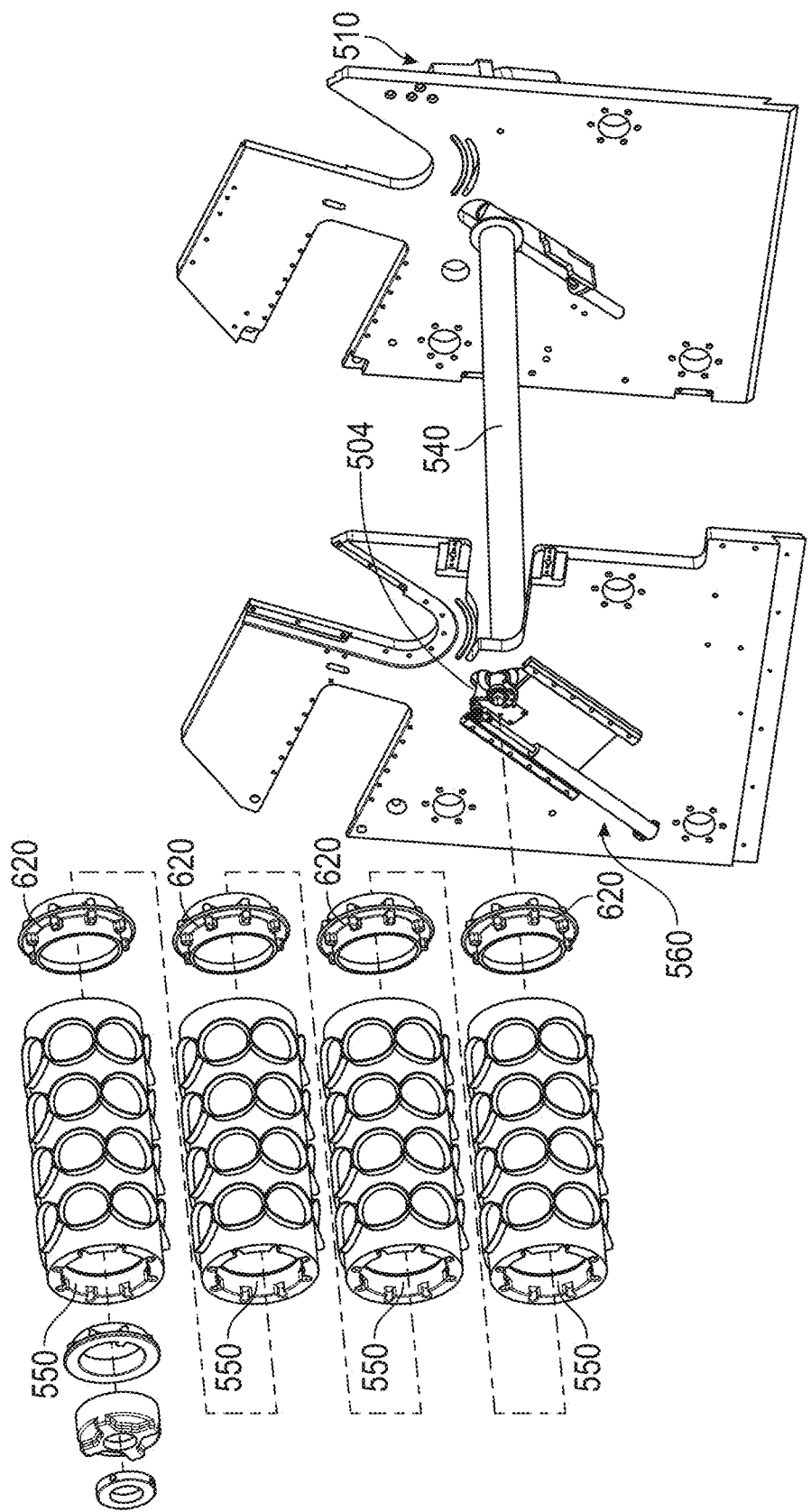
FIG. 40 is a further exploded view of the cutting roller assembly with the cutting sleeve fully removed from the driveshaft.
Figure 41:
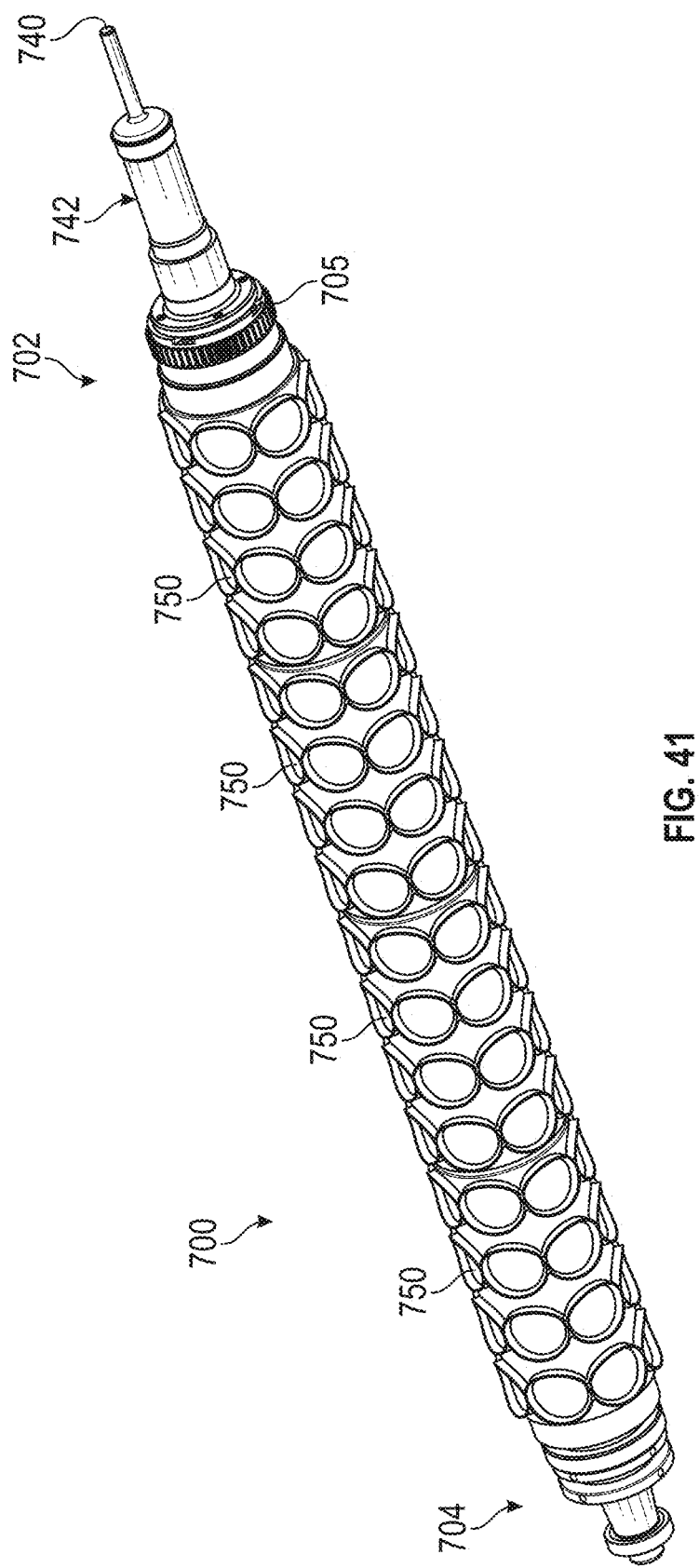
FIG. 41 is a perspective view of another embodiment of a cutting roller.
Figure 42:
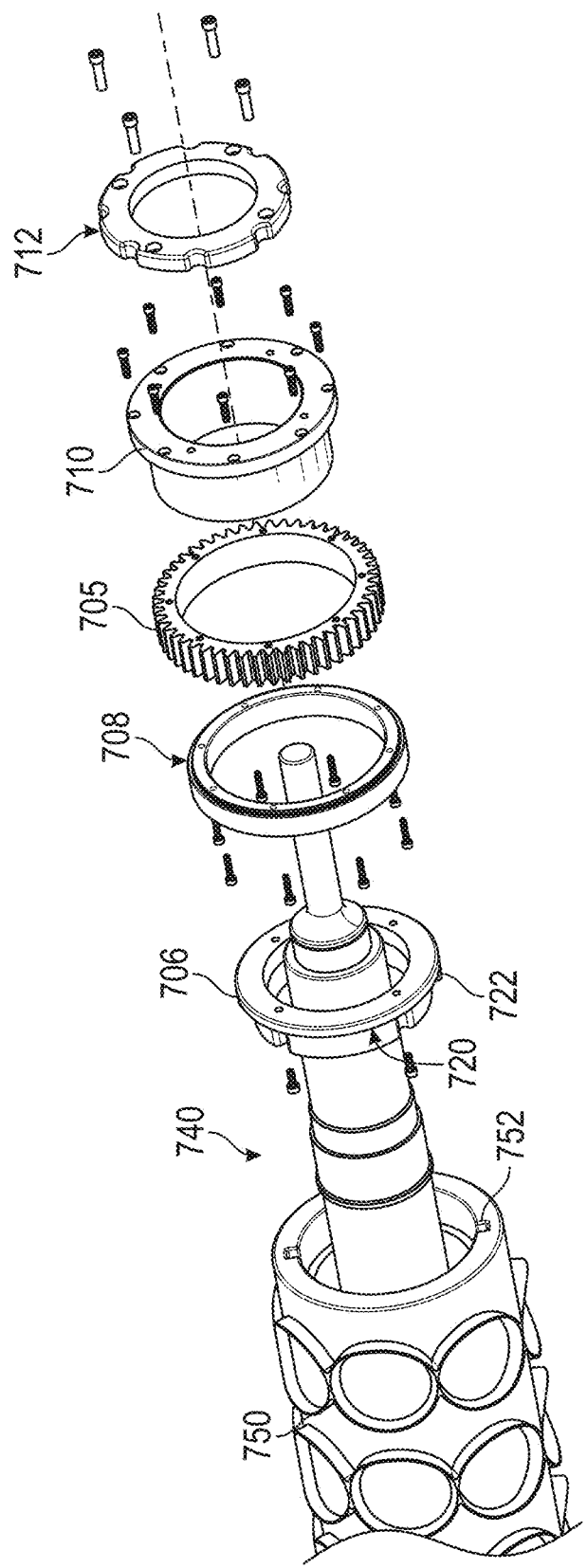
FIG. 42 is an enlarged and exploded view of the drive-end of the embodiment of FIG. 41.

With continued reference to FIG. 39, the cutting roller assembly 500 can optionally include a number of individual sleeves 550, connected by way of intermediate torque transfer members 620. Intermediate torque transfer member(s) 620 may include a similar arrangement of engagement members to torque transfer member 542 and torque transfer member 604. For example, the intermediate torque transfer members 620 can include the same arrangement of engagement members (e.g., protrusions) and a collar (e.g., like collar 551) on both sides to thereby engage with the recesses 556 of two sleeve members that are arranged in an end to end manner. For example, FIG. 40 illustrates a further exploded view of the cutting roller assembly 500, with all of the sleeves 550 removed from the driveshaft 540 along with the three intermediate torque transfer members 620. In the embodiment illustrated in FIG. 40, the cutting roller assembly 500 comprises four sleeves 550. However, it is recognized that the cutting roller assembly 500 can comprises any number of sleeves 550 with enough intermediate torque transfer members 620 to connect the sleeves 550. For example, the cutting roller assembly 500 may comprise, 1, 2, 3, 4, 5, 10, 15, 20, and/or the like sleeves 550. Having multiple interfacing sleeves 550 can provide some advantaged. For example, if the cutting guides 555 on a single sleeve 550 are damaged, only the damaged sleeve 550 may need to be replaced. Compared to traditional systems, replacing a single damaged sleeve 550 would result in large cost savings, compared to replacing an entire cutting roller.

As noted above, the drive assembly 510 is provided with the bearing assembly 518 that is sufficiently strong to support the driveshaft 540 in a cantilevered manner, thereby allowing the sleeves 550 to be removed from the driveshaft 540 through the access aperture 504 and through the access assembly 560. After removal of the sleeves 550, replacement sleeves (not shown) can then be reinstalled on the driveshaft 540 and the access assembly 560 can be readjusted in a manner in the opposite sequence described above. The ability to quickly remove and replace sleeves 550 can result in less time being spent changing cutting rollers compared to traditional systems and a corresponding increase in food product production.

FIGS. 41-44 illustrate a modification of the cutting roller assembly 500, identified generally by the reference numeral 700. The cutting roller assembly 700 includes a drive end 702, an access end 704, and one or removeable cutting sleeves 750 secured to a driveshaft 740.

In some embodiments, the drive end 702 can be configured for being gear driven on the inside of the housing covering the support frame assembly 416. For example, the driveshaft 740 can include a bearing support portion 742 configured to be supported by a bearing, such as, for example, the bearing assembly 518 described with reference to FIG. 31. Additionally, the drive end 702 can include a driven gear 705 configured to be engaged with a drive gear (not shown) within the sheeter 410.

The driven gear 705 can be rotationally coupled with a torque transfer member 706. For example, the driven gear can be sandwiched between a spacer member 708 and a collar member 710 for securing the driven gear 705 onto the driveshaft 740. An end plate member 712 can be secured to the collar member 710.

The torque transfer member 706 can include a collar portion 720 and at least one first engagement portion 722 configured to cooperate with a second engagement portion 752 on the sleeve 750. For example, the first engagement portion 722 can be in the form of one or more protrusions extending from the collar portion 720 and the second engagement portion 752 can be one or more recesses configured to receive the protrusion(s) 722. In some embodiments the torque transfer member 706 can include a plurality first engagement portions 722 (e.g., in the form of a plurality of protrusions) and the sleeve 750 can include a corresponding plurality of second engagement portions 752 (e.g., in the form of a plurality of recesses). In the illustrated embodiment, the first engagement portion 722 comprises two protrusions and the second engagement portion 752 comprises two recesses disposed 180° from each other.

The torque transfer member 706 can be secured to the spacer 708 with threaded fasteners and thus rotationally coupled with the driven gear 705. Additionally, the first engagement portions 722 can be received within the second engagement portions 752, thereby transferring torque from the gear 705 to the torque transfer member 706 and into the sleeve 750.

Figure 43:
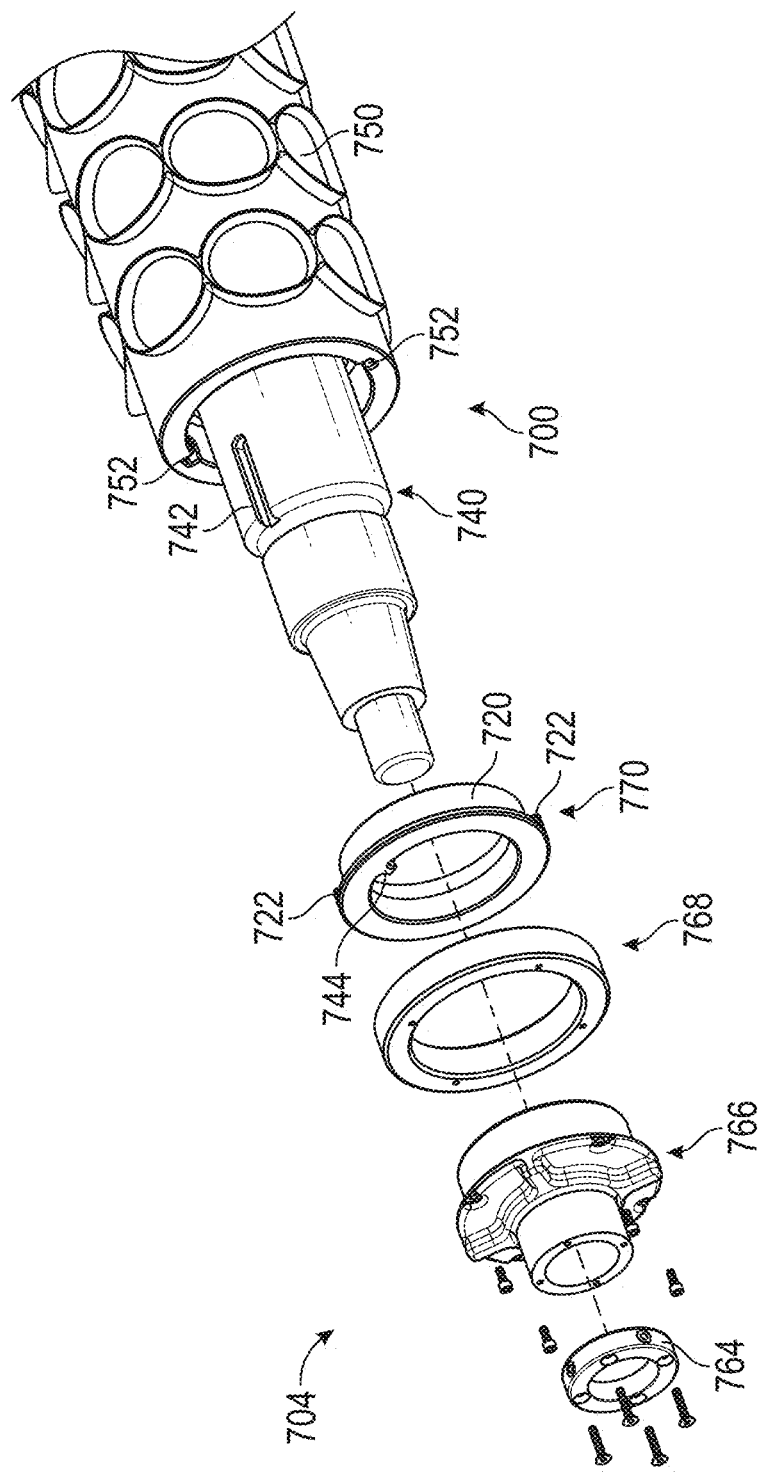
FIG. 43 is an enlarged perspective view of the access end of the embodiment of FIG. 41.

With reference to FIG. 43, the access end assembly 704 of the cutting roller assembly 700 can include an arrangement of components similar to that of the access assembly 560 (e.g., described with reference to at least FIG. 37).

As described above with reference to the torque transfer member 706, the torque transfer member 770 can include one or more first engagement portions (e.g., protrusions) 722, protruding from a collar portion 720. Additionally, the driveshaft 740 can include a keyway 742 configured to engage with another protrusion or "key" 744. Thus, rotation of the torque transfer member 722 is keyed to the driveshaft 740. Additionally, the protrusions 722 on the torque transfer member 770 can be received in the recesses 752 of the sleeve 750 and thus torque can be transferred from the torque transfer member 722 to the sleeve 750. With the guide plate 570 in a downward position, the aperture 504 can be in the open position as described with reference to FIGS. 37-39.

Figure 44:
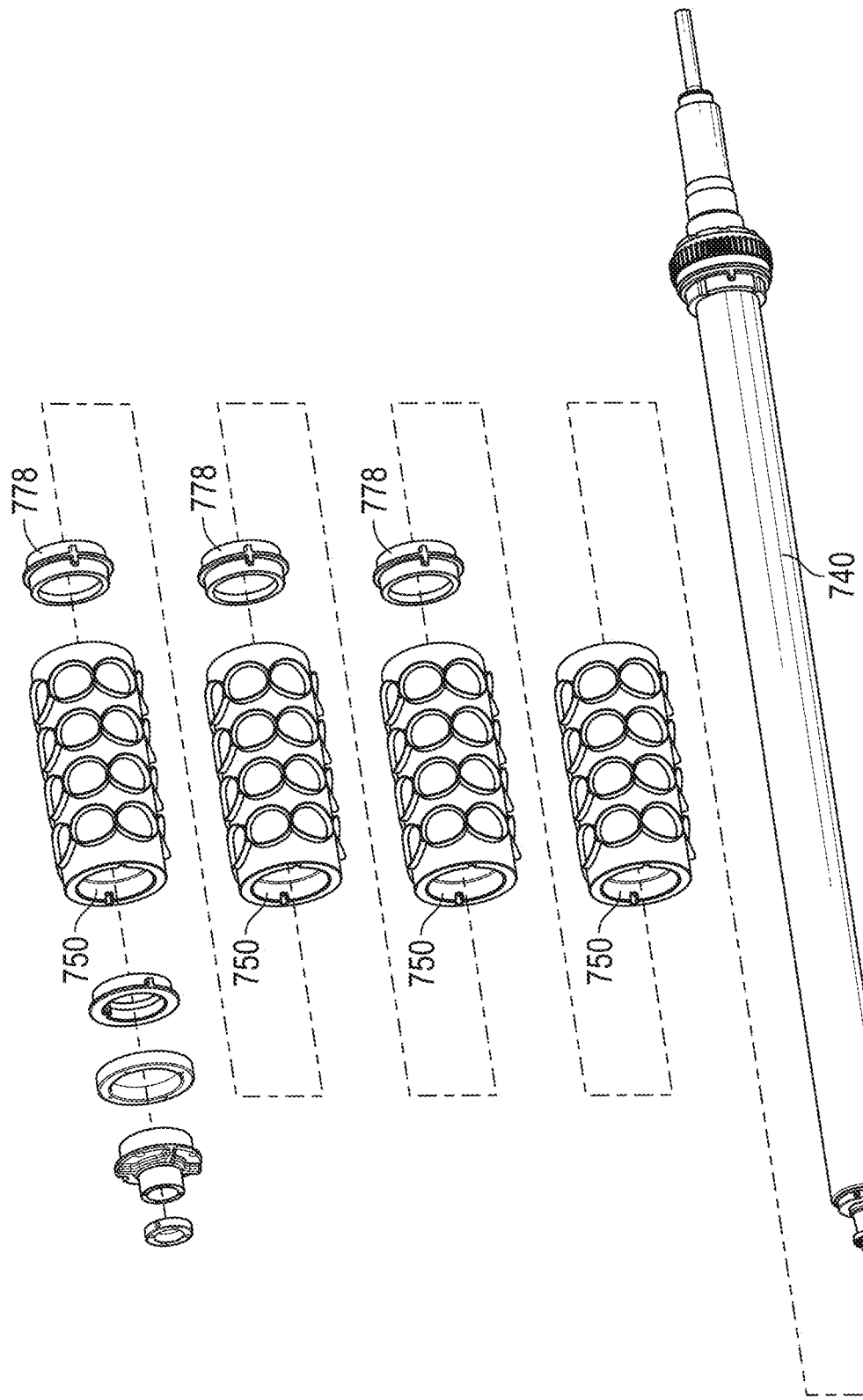
FIG. 44 is a fully exploded of the cutting roller assembly of FIG. 41

With reference to FIG. 44, with the aperture 504 opened, all of the sleeves 750 can be removed from the driveshaft 740 for replacement. Like the intermediate torque transfer members 620 described above, the assembly 700 can include one or more intermediate torque transfer members 778.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In the foregoing specification, the systems and processes have been described with reference to specific embodiments thereof. It will, however, be evident that various modifications and changes may be made thereto without departing from the broader spirit and scope of the embodiments disclosed herein. The specification and drawings are, accordingly, to be regarded in an illustrative rather than restrictive sense.

Indeed, although the systems and processes have been disclosed in the context of certain embodiments and examples, it will be understood by those skilled in the art that the various embodiments of the systems and processes extend beyond the specifically disclosed embodiments to other alternative embodiments and/or uses of the systems and processes and obvious modifications and equivalents thereof. In addition, while several variations of the embodiments of the systems and processes have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the embodiments of the disclosed systems and processes. Any methods disclosed herein need not be performed in the order recited. Thus, it is intended that the scope of the systems and processes herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and sub-combinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination. No single feature or group of features is necessary or indispensable to each and every embodiment.

It will also be appreciated that conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the embodiments are not to be limited to the particular forms or methods disclosed, but, to the contrary, the embodiments are to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (for example, as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (for example, as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein but are to be accorded the widest scope consistent with this disclosure, the principles and the novel features disclosed herein.

What is claimed is:

1. A dough sheeting device comprising:
   a support frame having a first side member and a second side member, the second side member comprising a cutting roller access aperture; and
   a cutting roller assembly having an outer cutting surface and supported by the support frame to rotate relative to the support frame, the cutting roller assembly comprising:
      a drive shaft rotatably supported by the support frame and having a first end, a second end, and a cutting sleeve support surface disposed between the first end and the second end, a longitudinal axis of the drive shaft being orthogonal to a plane of the cutting roller access aperture, the longitudinal axis of the drive shaft extending through the cutting roller access aperture;
      a first removable cutting sleeve and a second removable cutting sleeve configured to slide over the cutting sleeve support surface of the drive shaft, each of the first removable cutting sleeve and the second removable cutting sleeve having a first axial end and a second axial end and an outer cutting surface portion defining at least a portion of the outer cutting surface of the cutting roller assembly, the first removable cutting sleeve having a first sleeve engagement portion disposed on the first axial end and configured to receive or transmit torque, the first removable cutting sleeve and the second removable cutting sleeve configured to be removed from the drive shaft through the cutting roller access aperture without removing the drive shaft from the dough sheeting device, the cutting roller access aperture having a height and a width that are larger than a diameter of the first removable cutting sleeve and the second removable cutting sleeve; and
      a first torque transfer member fixed to the drive shaft and comprising a torque engagement portion engaged with the first sleeve engagement portion.

2. The dough sheeting device of claim 1 further comprising:
   a rear roller having a first outer surface and supported by the support frame to rotate about a first axis; and
   a front roller having a second outer surface and supported by the support frame to rotate about a second axis spaced from the first axis such that juxtaposed portions of the first outer surface and the second outer surface define a pinch point gap.

3. The dough sheeting device of claim 1, wherein the first removable cutting sleeve further comprises a second sleeve engagement portion on the second axial end, the second sleeve engagement portion comprising a plurality of recesses, wherein the second removable cutting sleeve further comprises a third sleeve engagement portion on the first axial end, the third sleeve engagement portion comprising a plurality of recesses.

4. The dough sheeting device of claim 3, further comprising:
   an inter-sleeve torque transfer member disposed on the cutting sleeve support surface of the drive shaft and between the first removable cutting sleeve and the second removable cutting sleeve, the inter-sleeve torque transfer member comprising:

a first side and a second side opposite the first side;
a first intermediate engagement portion disposed on the first side and engaged with the second sleeve engagement portion of the first removable cutting sleeve; and
a second intermediate engagement portion disposed on the second side and engaged with the third sleeve engagement portion of the second removable cutting sleeve.

5. The dough sheeting device of claim 1 further comprising:
an access door supported by the second side member over the cutting roller access aperture, the access door being moveable between an open position and a closed position.

6. The dough sheeting device of claim 5 further comprising:
a first bearing support surface at the first end of the drive shaft;
a second bearing support surface at the second end of the drive shaft;
a first bearing assembly supported by the first side member of the support frame and rotatably supporting the first bearing support surface; and
a second bearing assembly supported on the second bearing support surface.

7. The dough sheeting device of claim 6, wherein the first bearing assembly supports the drive shaft in a cantilevered manner when the access door is in the open position.

8. The dough sheeting device of claim 6, wherein the first removable cutting sleeve and the second removable cutting sleeve can be slid off the drive shaft and through the cutting roller access aperture when the access door is in the open position.

9. The dough sheeting device of claim 6 further comprising:
a first guide track and a first linear actuator, wherein the first linear actuator is configured to move the access door along the first guide track between the open position and the closed position.

10. The dough sheeting device of claim 6 further comprising:
a second guide track, a second linear actuator and a second guide plate, wherein the first bearing assembly is mounted to the second guide plate and wherein the second linear actuator is configured to move the second guide plate and the first bearing assembly along the second guide track between a deployed position and a retracted position.

11. The dough sheeting device of claim 6, wherein the first bearing assembly comprises at least two bearing sets spaced apart along the longitudinal axis of the drive shaft.

12. A cutting roller assembly for a dough sheeting device, the cutting roller assembly comprising:
a drive shaft having a first end, a second end, and a cutting sleeve support surface disposed between the first end and the second end;
a first removable cutting sleeve configured to slide over the cutting sleeve support surface of the drive shaft;
a second removable cutting sleeve configured to slide over the cutting sleeve support surface of the drive shaft; and
an inter-sleeve torque transfer member disposed on the cutting sleeve support surface between the first removable cutting sleeve and the second removable cutting sleeve, the inter-sleeve torque transfer member comprising:
a first plurality of protrusions extending radially from a first side of the inter-sleeve torque transfer member and configured to be received within a corresponding first plurality of recesses of the first removable cutting sleeve; and
a second plurality of protrusions extending radially from a second side of the inter-sleeve torque transfer member and configured to be received within a corresponding second plurality of recesses of the second removable cutting sleeve, the inter-sleeve torque transfer member configured to transfer torque from the first removable cutting sleeve to the second removable cutting sleeve.

13. The cutting roller assembly of claim 12, wherein the first removable cutting sleeve comprises:
a first axial end and a second axial end; and
a first sleeve engagement portion on the first axial end, the first sleeve engagement portion configured to receive or transmit torque.

14. The cutting roller assembly of claim 13, further comprising:
a first torque transfer member fixed to the drive shaft and engaged with the first sleeve engagement portion so as to transmit torque from the drive shaft to the first removable cutting sleeve.

15. The cutting roller assembly of claim 12, wherein the drive shaft comprises a first bearing support surface configured to mate with a bearing assembly so as to support the drive shaft in a cantilevered manner.

16. The cutting roller assembly of claim 12, wherein the inter-sleeve torque transfer member comprises:
a first intermediate engagement portion disposed on the first side and comprising the first plurality of protrusions; and
a second intermediate engagement portion disposed on the second side and comprising the second plurality of protrusions.

17. The cutting roller assembly of claim 12, wherein the first removable cutting sleeve comprises a plurality of cutting guides, the plurality of cutting guides comprising a plurality of raised edges and recesses.

18. The dough sheeting device of claim 1, wherein the drive shaft is fixed to the dough sheeting device.

* * * * *